US006990513B2

(12) United States Patent
Belfiore et al.

(10) Patent No.: US 6,990,513 B2
(45) Date of Patent: Jan. 24, 2006

(54) DISTRIBUTED COMPUTING SERVICES PLATFORM

(75) Inventors: Joseph Belfiore, Seattle, WA (US); David Campbell, Sammamish, WA (US); Steve Capps, San Carlos, CA (US); Steven Cellini, Seattle, WA (US); Charles Fitzgerald, Seattle, WA (US); Vivek Gundotra, Tustin, CA (US); Mark Lucovsky, Sammamish, WA (US); Paul Maritz, Bellevue, WA (US); Amit Mital, Kirkland, WA (US); Eric Rudder, Mercer Island, WA (US); Keith Short, Redmond, WA (US); Kaviraj Singh, Redmond, WA (US); Peter Spiro, Mercer Island, WA (US); Tandy Trower, Woodinville, WA (US); David Vaskevitch, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 853 days.

(21) Appl. No.: 09/887,847

(22) Filed: Jun. 22, 2001

(65) Prior Publication Data

US 2002/0059425 A1    May 16, 2002

Related U.S. Application Data

(60) Provisional application No. 60/213,562, filed on Jun. 22, 2000.

(51) Int. Cl.
*G06F 15/16* (2006.01)
(52) U.S. Cl. .................. 709/203; 709/217; 709/206
(58) Field of Classification Search ........ 709/201–203, 709/205–206, 230, 217–219
See application file for complete search history.

(56) References Cited

U.S. PATENT DOCUMENTS

| 5,252,951 | A  |   | 10/1993 | Tannenbaum, et al. ..... 345/156 |
| 5,265,014 | A  |   | 11/1993 | Haddock, et al. ....... 364/419.08 |
| 6,012,098 | A  | * | 1/2000  | Bayeh et al. ................ 709/246 |
| 6,021,403 | A  |   | 2/2000  | Horvitz, et al. ............... 706/45 |
| 6,327,608 | B1 | * | 12/2001 | Dillingham ................. 709/203 |
| 6,356,933 | B2 | * | 3/2002  | Mitchell et al. ............ 709/203 |
| 6,418,448 | B1 | * | 7/2002  | Sarkar ..................... 707/104.1 |
| 6,457,066 | B1 | * | 9/2002  | Mein et al. ................. 719/330 |
| 6,557,026 | B1 | * | 4/2003  | Stephens, Jr. ............... 709/203 |
| 6,697,849 | B1 | * | 2/2004  | Carlson ..................... 709/219 |
| 6,772,216 | B1 | * | 8/2004  | Ankireddipally et al. ... 709/230 |

OTHER PUBLICATIONS

"Microsof Message Queuing Services (MSMQ) Tips", Microsoft Corporation, Feb. 23, 1999.*

(Continued)

*Primary Examiner*—Krisna Lim
*Assistant Examiner*—Yasin Barqadle
(74) *Attorney, Agent, or Firm*—Workman Nydegger

(57) ABSTRACT

A server federation cooperatively interacts to fulfill service requests by communicating using data structures that follow a schema in which the meaning of the communicated data is implied by the schema. Thus, in addition to the data being communicated, the meaning of the data is also communication allowing for intelligent decisions and inferences to be made based on the meaning of the data. Cooperative interaction is facilitated over a wide variety of networks by messaging through a common API that supports multiple transport mechanisms. Also, mid-session transfer between client devices is facilitated by schema and the transport-independent messaging structure. The user interfaces of the client devices will appear consistent even if the client devices have different user interface capabilities.

26 Claims, 10 Drawing Sheets

OTHER PUBLICATIONS

Magedanz, T. "TINA—Architectural Basis for Future Telecommunications Services" Computer Communications, Elsevier Science Publishers VV, Amsterdam, NL. vol. 20, No. 4, Jun. 1, 1997. pp. 233-245.

Olsen, Margaret, et al. "Integrating Multiple Directory Services" Digital Technical Journal, Maynard, MA. vol. 18, No. 1, 1996, pp. 46-58.

Curtis, Katherine, et al. "Multimedia Content Management—Provision of Validation and Personalization Services" Multimedia Computing and Systems, 1999. IEEE International Conference in Florence, Italy Jun. 7-11, 1999. IEEE Computer Society, Los Alamitos, CA, Jun. 7, 1999. pp. 302-306.

Korman, David P, et al. "Risks of the Passport Single Sign-On Protocol" Ninth International World Wide Web Conference, Amsterdam Netherlands, May 15-19, 2000. vol. 33, No. 1-6. pp 51-58.

Anonymous "Corba Components—vol. 1" (draft) Online! Aug. 2, 1999, Object Management Group XP002260124. Retrieved from the Internet <URL: http://tao.doc.wustl.edu/components/CCM/99-07-01(CCM-V1).pdf>.

Box, D. et al. "DRAFT-BOX-HTTP-SOAP-00.TXT" Internet Article, Online! Sep. 1999, XP002260123. Retrieved from the Internet <URL:http://ftp.ics.uci.edu/pub/ietf/http/draft-box-http-soap-00.txt>.

Farjami, P, et al. "Advanced Service Provisioning Based on Mobile Agents" Computer Communications, Elsevier Science Publishers, BV, Amsterdam, NL. vol. 23 No. 8, Apr. 2000. pp. 754-760.

Pinto, Alexandre S., et al. "TINA-Based Environment for Mobile Multimedia Services" Telecommunications Information Networking Architecture Conference Proceedings, 1999. TINA '99 Oahu, HI, Apr. 12-15, 1999. IEEE, Piscataway, NJ, Apr. 12, 1999. pp. 54-65.

Soussev, Vassil, et al. "Integrating XML and Object-Based Programming for Distributed Collaboration" Enabling Technologies: Infrastructure for Collaborative Enterprises, 2000. IEEE $9^{th}$ International Workshops in Gaithersburg, MD, Jun. 14-16, 2000, IEEE Computer Society, Los Alamitos, CA, Jun. 14, 2000. pp. 254-259.

MEYER, Michael, et al. "THE ON-THE-MOVE CONCEPT FOR MOBILE MIDDLEWARE" ISS 1997. XVI World Telecommunications Congress Proceedings (International Switching Symposium). Global Network Evolution: Convergence or Collision? Toronto, Sep. 21–26, 1997, ISS. World Telecommunications Congress (International Switching Symposium). pp. 373–378.

\* cited by examiner

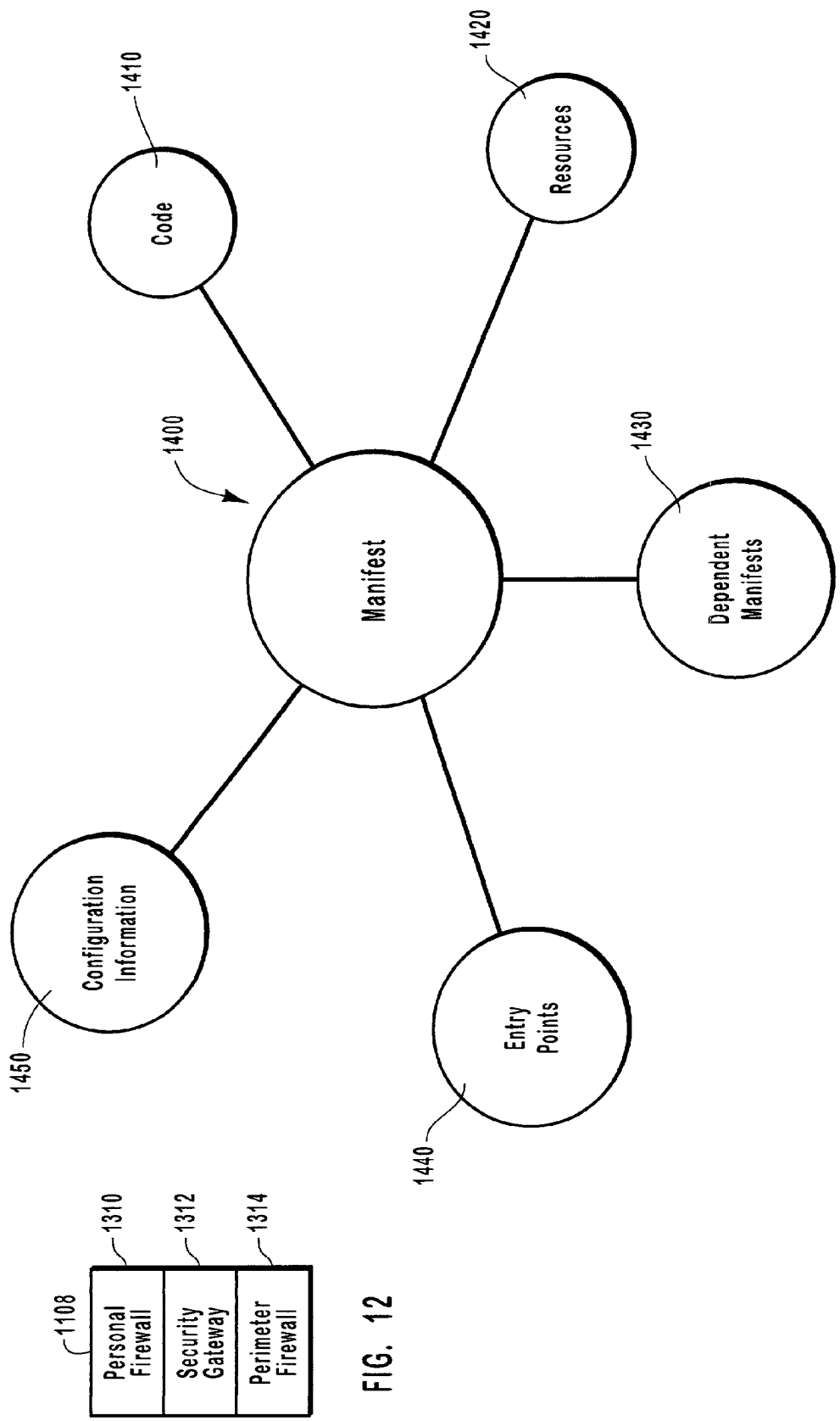

DISTRIBUTED COMPUTING SERVICES PLATFORM

CROSS-REFERENCE TO RELATED APPLICATIONS

The present invention claims priority from U.S. provisional application Ser. No. 60/213,562, filed on Jun. 22, 2000 and entitled "Distributed Computing Services Platform", which provisional application is incorporated herein by reference in its entirety.

BACKGROUND OF THE INVENTION

1. The Field of the Invention

The present invention relates to the field of communications. More specifically, the present invention describes a distributed computing services platform for facilitating improved communications and collaboration across computer networks (such as the Internet).

2. The Prior State of the Art

The Internet has revolutionized the way people communicate and has ushered in a new era in human history often termed the "information age." In essence, the Internet includes a large constellation of networked computers that are spread out over much of the world. Sophisticated computers, software, and networking technology have made communication over the Internet fairly straight forward from the viewpoint of the end user.

For example, a user can compose an electronic mail or "e-mail" message using commonly available electronic mail software. After specifying the address of the recipient(s), the user simply transmits the message by, for example, using a mouse to activate a "send" icon on the computer display. The message is then routed over the Internet from one computer system to the next until the message arrives at the destination computing device.

In addition, conventional browser software allows the user to request information such as a Web page from remote computers. After the user enters the address of the Web page, the browser then causes the user's computer to transmit the request using widely recognized communication protocols such as, for example, HyperText Transport Protocol (HTTP). The request is then routed using the destination address to the destination computer or Web site.

The remote Web site evaluates the request and returns an appropriate response often including the information requested. The requested Web page is returned in a format, such as HyperText Markup Language ("HTML") format, that is parsable by the Web browser. The parsed Web page is then rendered and presented to the user on the computer display.

Web browser software is available for many types of widely available computers including general purpose personal computers (PCs), television set top boxes, personal digital assistants, cellular telephones and the like. In addition, there are millions of Web sites that are publicly available to anyone with access to such conventional browser software and an Internet connection. These factors combine to allow more people more access to more information than ever before.

In sum, the Internet provides simple global connectivity for a large number of users. While the current use of the Internet provides many advantages to businesses and individuals alike in providing access to information, the Internet could be more efficiently used to access and use information in a more flexible manner. For example, one dominant use of the Internet can generally be characterized as "read-only." After a publisher creates and publishes a Web page, the Internet essentially serves as a presentation tool that allows users to read the information on the page. The Internet itself provides little or no capabilities for the user to write, edit or otherwise interact with the Web Page.

Also, while the Internet allows individuals to directly access millions of Web sites, there are few, if any, standards that allow Web sites to communicate or share information with one another. Each Web site typically maintains different ID's, preferences, data formats and schemas, connectivity and so forth. For this reason, it can take significant time and expense to enable interaction between two Web sites, let alone numerous Web sites. Thus, Web sites typically do not harvest the vast and rich spectrum of information offered by other Web sites on the Internet. Instead, many Web sites are forced to independently collect and compile information into a somewhat static form, even though that is already available from different Web sites. Therefore, although there is widespread connectivity between a vast number of sites and computers via the Internet, little has been done to take advantage of such connectivity in the form of automated interaction and the revolutionary advances that could be enabled remain largely unrealized.

The efficiency and flexibility of the Internet is also limited by other factors constraining users' access to information and services. For example, a user equipped with a personal computer may have access to a significantly larger set of Internet resources than the user of a cellular phone due, for example, to constraints associated with the underlying platform. When platform constraints are not an issue, other problems (such as security and storage) may still limit access to Internet resources by the same user and, even more so, by different users, across platforms. Even if the same information and services can be accessed, overall efficiency and flexibility are impaired when, for example, the user must negotiate a significantly different user interface or follow different protocols to access those resources.

Further, Internet users are often confronted with too much information that is difficult to filter and organize. For example, it is common for a web search engine to return thousands of possible "hits" to a simple query. The user must manually filter through these hits to find relevant information. Also, users' email in-boxes are often bombarded with junk e-mail or "spam" that are often irrelevant or low priority to the user. Although some in-box filters exist, the user must still scan through the remaining messages in order to find the high priority or important messages.

Therefore, there is a need for systems and methods that facilitate greater and more consistent user interaction and collaboration, and inter-Web site communication over the Internet. There is also a need for more personalized, relevant information to be provided to users, without overwhelming users with too much information.

SUMMARY OF THE INVENTION

The foregoing problems in the prior art are overcome by the present invention, which is a distributed computing services platform that facilitates more Internet-based collaboration and more inter-Web site communication. First, the general conceptual architecture of the platform is summarized. Then, the integrated technology components of the platform are summarized. These components include programming model, schema, user interface, events, messaging, storage, directory, security, and code management. Lastly, scenarios are described which illustrate how the present invention facilitates the improved collaboration and communication in people's everyday lives at work and at home.

The distributed computing services platform of the present invention facilitates communication between client devices and a server federation, and between servers within a server federation. The server federation may be comprised of, for example, servers and services on the Internet and/or a corporate intranet. The clients and servers, while maintaining some degree of autonomy, are integrated through meaningful communication and information exchange. This meaningful exchange is enabled by exchanging information through common schema across a transport-independent messaging infrastructure.

The platform comprises a number of distributed yet integrated technology components and services, including programming model, schema, user interface, events, messaging, storage, directory, security, and code management. The programming model defines a structure for an application that can be flexibly distributed between the client and the server federation. An application that follows the programming model includes page, emissary, and fiefdom components. The page component hosts controls typically used to project a user interface for the specific client device in communication with the server federation. The emissary component generically represents the client to the server federation. The fiefdom component owns the data that constitutes the primary resource of the application. These components generally communicate with each other through asynchronous messaging. The messages may be generated by logic internal to a component, by events generated internal to the component, or in response to messages received from other components.

The platform relies on schema to make communication meaningful. Schema is a set of rules or standards that define how a particular type of data can be structured. Thus, the federation's computer systems use schema to recognize that data conforming to a particular structure represents an item of a particular type used throughout the federation. Thus, the meaning of data, rather than just the data itself, may be communicated between computer systems. For example, a computer device may recognize that a data structure that follows a particular address schema represents an address, enabling the computer to "understand" the component part of an address. The computer device may then perform intelligent actions based on the understanding that the data structure represents an address. Such actions may include, for example, the presentation of an action menu to the user that represents things to do with addresses. Schemas may be stored locally on a device and/or globally in the federation's "mega-store." A device can keep a locally stored schema updated by subscribing to an event notification service (in this case, a schema update service) that automatically passes messages to the device when the schema is updated. Access to globally stored schemas is controlled by the security infrastructure.

User interaction with devices occurs mainly through a user interface. The user interface (UI) of the present invention is multi-modal, intelligent and responsive. The user interface scales appropriately to the technical capabilities of various client and server devices. The user interface also remembers the state, session and preference status of a user across devices. Thus, a user may switch from one device to another mid-session with all state and preference information remaining consistent, or different users may share the same device and be presented with different interfaces based on their preferences. After a user properly authenticates themselves via the security infrastructure, user preference information can be accessed through directory services which store user-specific information (such as favorites, contacts, etc.) specified by schema. The user interface is also multi-modal, meaning that the user can interact with the UI through multiple modes. For example, the user input may be through "traditional" methods such as keyboard entries or mouse clicks. The UI also allows other input methods, such as audio/voice input for devices that are equipped with microphones or stylus/touch input for devices that are equipped with touch screens or pads.

Events within the platform are used to synchronize, report or provide notification about certain activities. The platform's event component includes event sources that generate events that are communicated to event sinks throughout the federation. The system includes an event composition mechanism that transforms atomic events into progressively higher-level events even including inferential machinery that transforms input events into higher level events through logical or probabilistic reasoning about the input events. The event composition mechanism adapts the set of available atomic events into observations that are appropriately matched to the informational requirements of software components, providing the components with information at the right level of abstraction to make good decisions. Events are accessible to software components via several mechanisms including: 1) a subscription by the software components to events of certain classes provided by one or more event sources; 2) by intermittent polling of one or more sources; or 3) by listening to wider broadcasts of events by event sources. For any of these methods of accessing events, the events are accessible to applications via the messaging infrastructure, although the message transfer type may be dependent on the type of event. For example, events may be associated with different tolerances in latencies, so that the communication of events may be guided by the cost associated with the delay in transmission. For this reason, an event notification that a mission-critical server is down requires a guarantee of immediate delivery to its destination. Other events, such as an update on the general location of a user may be associated with lower costs of delay. Also, the user interface may notify users of particular events in a manner proportional to the urgency of the notification. For example, a network administrator might receive an urgent pop-up message that a server is down, or a teenager may receive notification that one of his friends is in the area through an instant messenger or chat interface. Event notification is also controlled by authentication and authorization security mechanisms.

The messaging component 160 is the mechanism by which events and other information may be exchanged across the platform. The messaging services provide efficient and reliable messaging over the Internet using any of a variety of transports, including HTTP. The messaging infrastructure establishes a standard interface for application developers to write applications that take advantage of the overall architecture of the messaging services and the other features associated with the invention. Messaging may occur asynchronously thus enabling the constant update of pages without requiring user-initiated page refreshing.

The storage service allows for distributed storage throughout the server federation. As discussed above, user preferences and files may be stored in a "mega-store" in the federation and, after proper authentication, the user can access this information from any location using any device. The "mega-store" is not necessarily all on a single server; storage may be distributed across servers in the federation based on efficiency, memory allocation, frequency of access, etc. The information stored in the server federation can also be replicated locally to allow a user to work off-line. When the user goes back on-line, an event is generated that triggers automatic synchronization of the off-line and on-line data. The storage service includes a data engine that is built upon conventional file systems. Methods for prioritizing information for local caching and for allowing cached information to be removed based on changes in context and/or the age of the cached information may be employed to maximize the value of the cached information.

To support the concept that a user can be known or identified easily by various services, a directory component is provided. The directory service of the present invention supports the federation by including per-enterprise or per-Web site meta-directories with synchronization between the meta-directories. This synchronization is facilitated by standardized schema used to communicate between directories. These meta-directories provide references to specific adapted directories where more detailed information can be found. For example, directories can contain user identity information (name, address, etc.), security information (what information the user is authorized to access), etc.

The security infrastructure of the present invention provides improved security across server federations. To ensure user mobility and privacy, the security infrastructure provides for a single individual having multiple identities. For example, an individual may have a professional identity and a personal identity. The present invention facilitates authentication and authorization in which these multiple entities are treated as a single entity. Furthermore, improved firewall technology is described in which personal firewalls, perimeter firewalls, and security gateways operate independently from each other. Security may be implemented by any combination of technologies, such a passwords, smartcards, biometrics (fingerprints, retina scan, etc.), key exchange, encryption, etc.

One goal of the platform is to ensure that users transparently have access to the most updated applications and code that they need. The code management system of the present invention includes a manifest that describes the structure of an application including code, resources, entry points and configuration information for the application and its constituent components. The code management system allows applications conforming to the programming model to be deployed and updated across the federation in an efficient manner.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 12 illustrates an improved firewall configuration for use with the present invention.

FIG. 13 illustrates a code management manifest for use in software development.

DETAILED DESCRIPTION OF THE INVENTION

A. Introduction

The present invention extends to methods, systems and computer program products comprising a distributed network services platform which facilitates more Internet based collaboration and inter-Web site communication. The various architectural components of the present invention may be distributed across various special purpose or general purpose computing devices, including various hardware components, such as personal computers, servers, laptops, hand-held devices, cell phones or the like, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computing device. By way of example, and not limitation, such computer-readable media can be physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computing device. When information is transferred or provided over a network or another communications connection (either hardwired, wireless, or a combination of hardwired or wireless) to a computing device, the computing device properly views the connection as a computer-readable medium. Thus, any such a connection is properly termed a computer-readable medium. Combinations of the above should also be included within the scope of computer-readable media. Computer-executable instructions comprise, for example, instructions and data which cause any general or special purpose computing device to perform a certain function or group of functions.

In this description, the general architecture of the present invention may be implemented is first described under the ARCHITECTURE section. Then, sections are set forth describing each of several technology components of the architecture. These sections include the PROGRAMMING MODEL, SCHEMA, USER INTERFACE, EVENTS, MESSAGING, STORAGE, DIRECTORY, SECURITY, and CODE MANAGEMENT. Finally, various scenarios will be described in the SCENARIOS section that illustrates how the architecture and technology components facilitate improved Internet communication and collaboration.

B. Architecture

Figure 1:
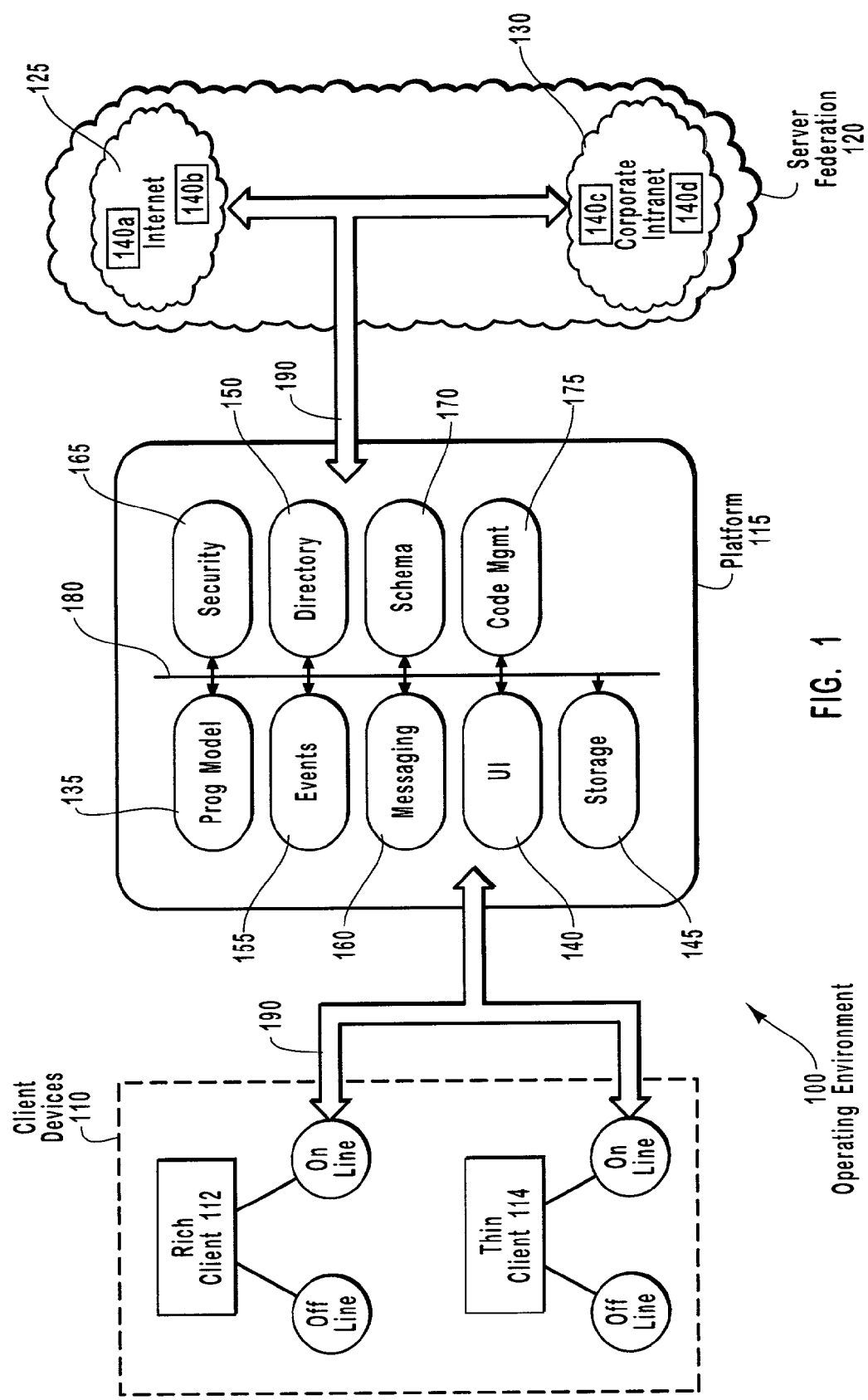
FIG. 1 illustrates an architecture that provides a suitable operating environment for the present invention.

FIG. 1 schematically illustrates an operating environment 100 in which the present invention may be implemented. Client devices 110 have a wide variety of processing and memory capabilities. For example, the client devices 110 include "rich" clients (e.g., rich client 112) that are capable of performing a high degree of data processing such as desk top Personal Computers (PCs) and "thin" clients 114 that are less capable of processing data such as cellular phones and pagers. It is understood that the distinction between a rich client and a thin client is a spectrum; there are many devices (hand-held or Tablet PCs) for example, that fall in the middle of the spectrum.

Regardless of the device type or the processing capability of the client, most client devices may be operated by a user in either an online or offline state. While online, each client device may communicate with server federation 120 via the distributing computing services platform 115 of the present invention. Conceptually, server federation 120 comprises, for example, the world-wide network of computer systems commonly referred to as "the Internet" 125 as well as one or more private computer networks, such as corporate intranets 130. The servers within the federation (i.e., servers 140a, 140b in the Internet 125 and servers 140c, 140d in the corporate intranet 130) also communicate with each other via the platform 115.

Conceptually, platform 115 comprises several platform components comprising technology and services, including a programming model component 135, a user interface component 140, a storage component 145, a directory component 150, an event component 155, a messaging component 160, a security component 165, a schema component 170, and a code management component 175. Although conceptually illustrated as distinct in FIG. 1, it is understood that each of the platform components 135, 140, 145, 150, 155, 160, 165, 170 and 175 may be distributed throughout the server federation 120 and client devices 110. Further, many of the platform components provide services to the client devices 110 and server federation 120. Each platform component is loosely-coupled to the other platform components, as indicated by arrows 180, enabling the platform 115 to provide integrated technologies and services. The distributed nature of the platform 115, along with the supporting services and integration of the platform components contribute to and facilitate the advanced features and advantages of the present invention.

The clients 110 and servers 140 of the server federation 120, while maintaining some degree of autonomy, are integrated through meaningful communication and information exchange using common schema across a transport-independent messaging infrastructure, as provided by the schema platform component 170 and the messaging platform component 160 discussed in more detail below. Bi-directional arrows 190 represent this communication that occurs among the servers and clients. Bi-directional communication allows a client device 110 to read from, write to, and otherwise interact with the server federation 120. The present invention may be implemented using any communication mechanism that is able to communicate data bi-directionally according to a schema. In one example, the communication occurs via an eXtensible Markup Language ("XML") format which enables communication of name/value pairs.

In some instances, communication between a client device 110 and the server federation 120 may also be one-way or "read-only". This one-way communication is the predominant form of communication on the Internet today. In this type of "read-only" communication, after a publisher creates and publishes a web page, the Internet essentially serves as a presentation tool that allows users to read the information on the page. Technologies that permit this presentation include the Wireless Application Protocol ("WAP") which permits communication to wireless devices. Also, a Web page format called HyperText Markup Language ("HTML") allows for information to be downloaded from a network site. The information is then parsed, rendered, and presented on a client display. The platform 115 of the present invention, however, extends the conventional web presentation model to allow for rich, interactive, bi-directional communication.

The platform 115 allows servers 140 within the federation 120 to cooperatively share information and/or perform functions. Rather than each server having to collect and compile information on their own, the servers can instead rely on the services of yet other servers where the information is readily available to implement an efficient division of labor. The user is then given rich information without the user having to worry about all the intricate inter-server communication that occurred in the server federation in order to produce the rich information. For example, the servers 140 in the server federation 120 may exchange information that allows for stock quotes from one server to be displayed in one portion of the user interface of a client device 110, news articles from another server to be displayed in another portion of the user interface of the client device, and instant messages from yet another server to be displayed in another portion of the user interface of the client device.

The servers 140 within the server federation 120 communicate and otherwise share information using standardized data structures or schemas provided by the schema platform component 170. Schemas allow for more meaningful interaction between servers and applications rather than just exchanging information between servers. This recognition of meaning allows the servers to perform functions based on the recognized meaning of the information. If an application recognizes information as meaning, for example, the address of a given entity, the application may perform certain functions based on that recognized meaning. For example, the application could automatically fill in an address field of a template corresponding to the given entity with the address information. The application could also detect that the zip code or state is missing within the address and thus automatically query other servers for the missing information so that all address fields may be filled in automatically without user intervention. Thus, the cooperation between the servers is even more productive since each of the servers is intelligent in that they recognize meaning associated with data and can then act on that information without requiring human intervention.

C. Programming Model

Figure 2:
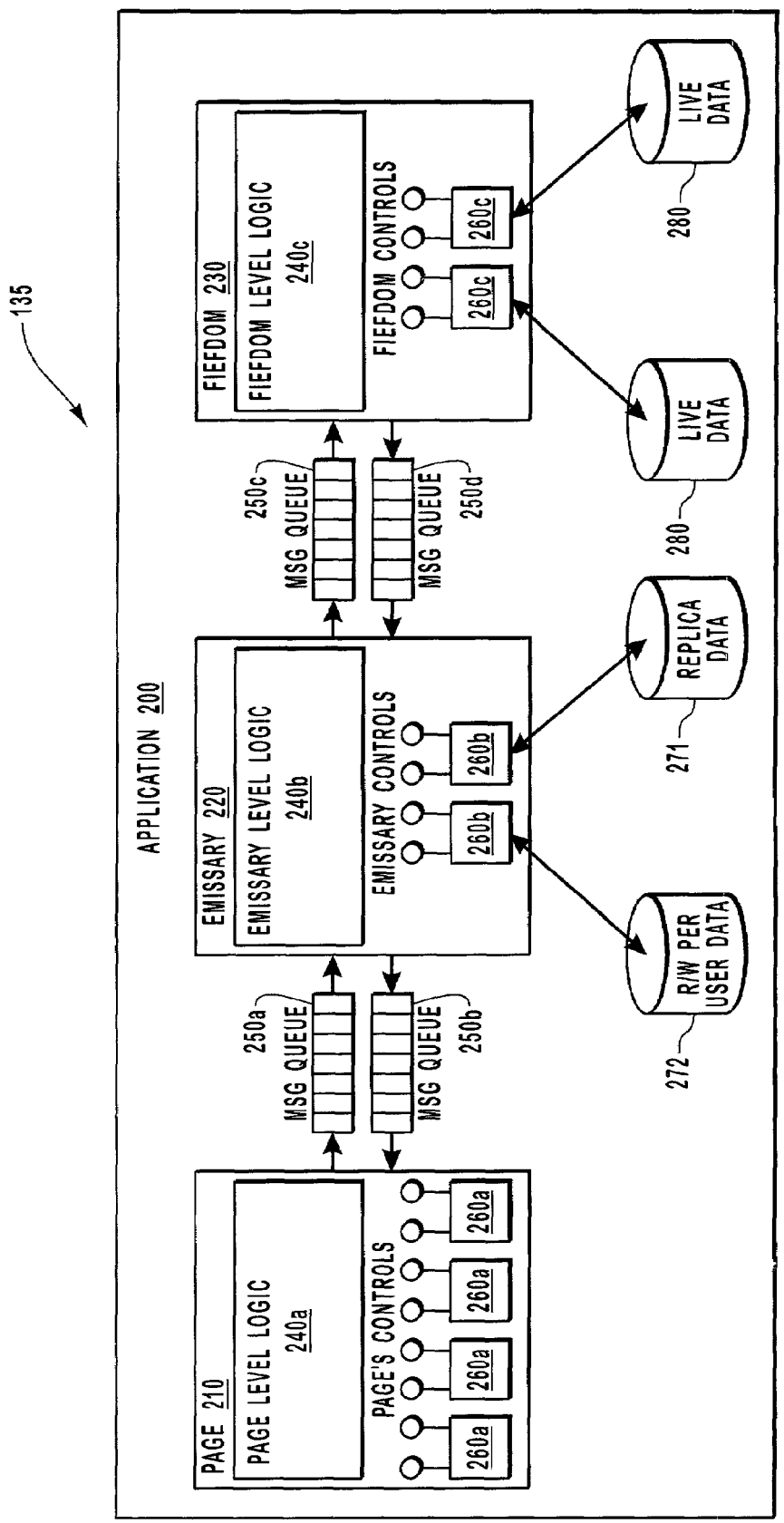
FIG. 2 illustrates a programming model for an application that may be implemented in a distributed fashion across the architecture of FIG. 1.

FIG. 2 illustrates the multi-tier programming model component 135 of platform 115. The programming model describes how an application 200 may be distributed to varying degrees among the client devices 110 and the server federation 120 of FIG. 1. An "application" is defined as a body of software that performs a function and may include a Web site. In a distributed application, components of the application may be stored on the client device while other components are part of the Web site. In general, the application 200 is composed of a number of application components including page component 210, emissary component 220 and fiefdom component 230. The page component 210 hosts controls to project a user interface or experience for the appropriate client device 110. The emissary component 220 generically represents the client to the server federation and, thus, acts as an emissary between the client and server federation. The fiefdom component 230 most directly controls the live data that constitutes the critical resource of the application 200. A single application may have a varying number of these components (for example, more than one page component). Also, some applications may not have all components.

Depending on the capabilities of the client, the page and emissary components may run on either the client or the server federation. In thin clients that have little or no processing capabilities, the page and emissary components would more likely run on the server federation. In rich clients that have greater processing capabilities, such as desktop Personal Computers (PCs), the page and emissary components may more likely run on the client.

Each of these application components, the page, emissary and fiefdom, contains a body of logic 240 (i.e., computer-executable instructions) that are used for sending and receiving asynchronous messages, via the messaging component 160, from one component to another. For example, page level logic 240a is used to asynchronously send messages from page component 210 through messaging queue 250a to emissary component 220. Emissary level logic 240b is used to asynchronously send messages from emissary component 220 through messaging queue 250b to page component 210. Emissary level logic 240b is also used to asynchronously send messages from emissary component 220 through messaging queue 250c to the fiefdom component 230. The fiefdom level logic 240c is used to asynchronously send messages from fiefdom component 230 through messaging queue 250d to emissary component 220. Thus, asynchronous information exchange occurs among the page, emissary, and fiefdom components of the application 200. In accordance with the messaging component 160, the message queues provide a reliable channel for sending messages between the components and support a variety of transmission semantics (i.e., guaranteed exactly once delivery, transactional delivery and no-guarantee delivery). The messages are defined via schema (for example, XML schema).

The body of logic 240 within each of the application components is also used to host controls 260. Generally, controls represent functionality that can be accessed by, and may be part of, the functionality of the program component. For example, the page level logic 240a hosts controls 260a, the emissary level logic 240b hosts controls 260b, and the fiefdom level logic 240c hosts controls 260c. Each control 260 exposes callable methods, properties that may be synchronously read or written, and events that may fire asynchronously causing logic in the page, emissary, and/or fiefdom components to execute. Generally, the events triggered by the controls are low-level events, such as an invocation of a method on an object. Thus, when a message is received by a component, it generates the events, which causes code in the components to execute.

The page component 210 uses the page level logic 240a for directly and synchronously manipulating controls 260a so as to project a user interface or experience. Depending on the user interface capabilities of the client, the page component may silently redirect invocations to particular versions of the page that are compatible with the client. For example, one page may be suitable for a rich client, other pages may be suitable for use with thin clients, such as phones or other such devices. The page component 210 may recognize the identity of the client by using the Uniform Resource Locator or URL of the client and thus redirect to the appropriate version of the page. Regardless of the page version, however, the user interface will appear consistent across a wide range of client devices, though some features will be present or more fully developed in richer versions of the page, as discussed below in connection with the user interface component 140.

The page component may also invoke different page versions depending on the processing capability of the device that is to implement the page component, regardless of the user interface available to the client. For example, if the page component is to be implemented on a client personal computer or server that has high processing power, the page component may redirect to a rich control page that allows extensive user interaction with the page. On the other hand, if the page component is to be implemented on a thin, less robust client, the page component may redirect to an HTML-only version of the page which typically contains little, if any, control features that allow the user to interact with the page.

The emissary component 220 encapsulates a body of logic 240b that can synchronously interact with controls 260b. The logic 240b is also designed to abstractly represent the client to the server in a standardized fashion no matter what the client device type. The emissary component may access read-only data published by the fiefdom component and stores such data in a replica data storage 271. The emissary component also contains per-user read/write (R/W) data such as shopping cart data that is stored in a R/W per user data storage 272. The body of logic 240b may be executed in response to incoming message from the message queues 250a or 250d.

The fiefdom component 230 encapsulates a body of logic 240c that logically "owns" the live data stored in live data storage 280. The body of logic 240c runs in response to messages received from emissary components such as emissary component 220 associated with the fiefdom component. The fiefdom component 230 performs security services on any emissary component that requests access to services.

Each component in the application maintains state information regarding the explicit user and session states. Thus, each component supports objects used for the replication of such user and session state information. This state information may be shared with the other components in the application through asynchronous messaging that supports the communication of such state information. Thus, each component may be made aware of the user interface state at any given point in the session. Furthermore, each component may be made aware of a user's preferences.

The benefits of the programming model component 135 will now be described. The components within the application are capable of asynchronous messaging. Accordingly, components are not required to explicitly request information in order to receive a message. Also, components are not required to receive an explicit request for information in order to send a message containing such information. Therefore, the programming model supports the sending of messages to the page component (and thus the updating of a user interface) without the user having to explicitly refresh the Web site. Thus, pages may represent asynchronous user interfaces in which the page is automatically updated as the page component receives messages from the emissary component. Also in such a situation, it may not be necessary for the emissary to access replica data, since the live data is available through the fiefdom.

In addition, the programming model includes controls that may fire asynchronously upon the happening of defined events, thus causing logic in the component to execute. This logic may send an asynchronous message to other components in response to the event thus allowing any of the components in the application to execute in response to defined events. Thus, the application is highly event driven. These events may drive methods to be asynchronously executed in any of the components of the application.

For example, the fiefdom component may host a control that is configured to fire in the event any new articles containing predefined words are added to a database. The triggering of the event may cause the fiefdom to send an asynchronous message through the emissary component to the page component. In response to this asynchronous message, the page component may render a notification message for presentation on the client thereby notifying the user of the new article. For example, if the client device is a thin client, the user interface may include a small notification window indicating the existence of such new articles. If the client device is a rich client, the user interface may display the new articles in their entirety on the screen. Any or all of the page, emissary, or fiefdom components may also undertake other action based on the same event such as the composing of an e-mail forwarding the article to an associate also interested in articles containing the predefined words. Thus, the programming model enables complex event driven applications.

Also the programming model facilitates the flexible positioning of these components between the client and the server federation, and permits for the online as well as offline use of the application. For example, the application may be constructed so as to allow either offline or online execution. This may be done by allowing page components to be hosted directly on the client with those page components communicating directly with emissary components also hosted on the client. When offline, the application accesses the replica data in the replica data storage 271 instead of the live data in the live data storage 280. Once online, access is restored, the emissary component sends queued updates to the fiefdom and the replica data is updated to reflect the current state of the live data managed by the fiefdom component.

The application may also be constructed so that all components, page, emissary and fiefdom are hosted on the server federation. In this case, the client must be online with the server federation in order to access the services of the page, emissary and/or fiefdom components.

In addition, some portions of an application may be available when offline (hereinafter, "offline portions") and other portions of the application may only be available when the client is online (hereinafter, "online portions"). The page and emissary components that enable the offline components of the application are hosted by the client, while the page and emissary components that enable the online portions of the application are hosted by the server federation.

Thus, many of the other technology components of the distributed computing 115 services platform of the present invention may be implemented in accordance with the programming model component 135.

D. Schema

One method for enabling more Internet based collaboration and inter-Web site communication is through more meaningful communication of data. This meaningful or intelligent communication provides more than just the data, but also supplies an inference of what and/or why the data is being communicated. This may be accomplished by structuring the data in a standard way or "schema" such as through standard data structures, protocols, communication transports, and other structured data exchanges. Information stored at client devices 110, in the servers 140, and/or according to the storage component 145 may be stored according to a schema. Schema are also used when communicating information between servers and in the server federation 120, between the server federation 120 and the clients 110, and between the platform components. In addition, asynchronous messages that are communicated between the various components 210, 220 and 230 of the application of FIG. 2 may be communicated using schema.

In many situations, a user desires to use data from multiple applications and data sources to create reports, analyze progress, predict needs, or detect changes in operating conditions. Unfortunately this type of data, although often available, is presently found in completely different formats as each application typically uses its own set of schema. In other words, although applications describe similar data types such as contacts and time, these data types often use different vocabulary and have different attributes from application to application. Thus, specialized translation or import/export functionality are conventionally needed in order allow applications that follow different schema to communicate.

In order to foster communication and collaboration in the server federation 120, the schema and schema services component of the present invention provides a foundation for interaction and collaboration on the server federation 120 for a wide variety of data structures, such as dates, addresses, prescriptions, show times, product descriptions, prices, receipts, preferences, medical records, movie reviews, or other related data types.

A universal schema is probably not realistic because different applications will have different needs and legacy and cross-platform applications will need to be supported. Instead, the schema component 170 of the present invention attempts to define "core schemas," which are a minimal common schema that defines only things that most applications will have in common. The core schemas are extendible, such that new schemas describing significant data entities useful for facilitating data interaction and collaboration may be defined and added to the core schemas described below. Additionally, schemas may function at several layers with the network including the operating systems or user interfaces of the client devices and server federation of FIG. 1.

There are several types of core schemas, including: (i) base types, (ii) social types, (iii) business types, (iv) system types, and (v) application types.

(i) Base types are used as the basic building blocks for other types. Exemplary base types include types such as objects, items, containers, databases, folders, messages, texts, or other base data structures. Translation of the various schema used by diverse applications into a base type schema may be accomplished by a translation filter, described below.

(ii) Social Types represent or describe items used in daily tasks and interactions. Exemplary social types include items such as contacts, profiles, calendar, tasks, times, locations, finances, and other socially exchanged information or identification. Like base types, translation filters may be created to transfigure incompatible data structures into social type schema.

(iii) Business types are used to describe common things in business environments and business-to-business (B2B) transactions. Exemplary business types include types such as products, accounts, customers, employees, distributors, retailers, suppliers, and other business data.

(iv) System types define the structure of information used for managing systems. Exemplary system types include types such as policies, schedules, services, devices, and other system related information.

(v) Application types define the structure of applications and services. Exemplary application types include types such as application manifests, assembly manifests, and COM+ type descriptions. System and application types are based on information specific to the system and hardware configurations.

Figure 3:
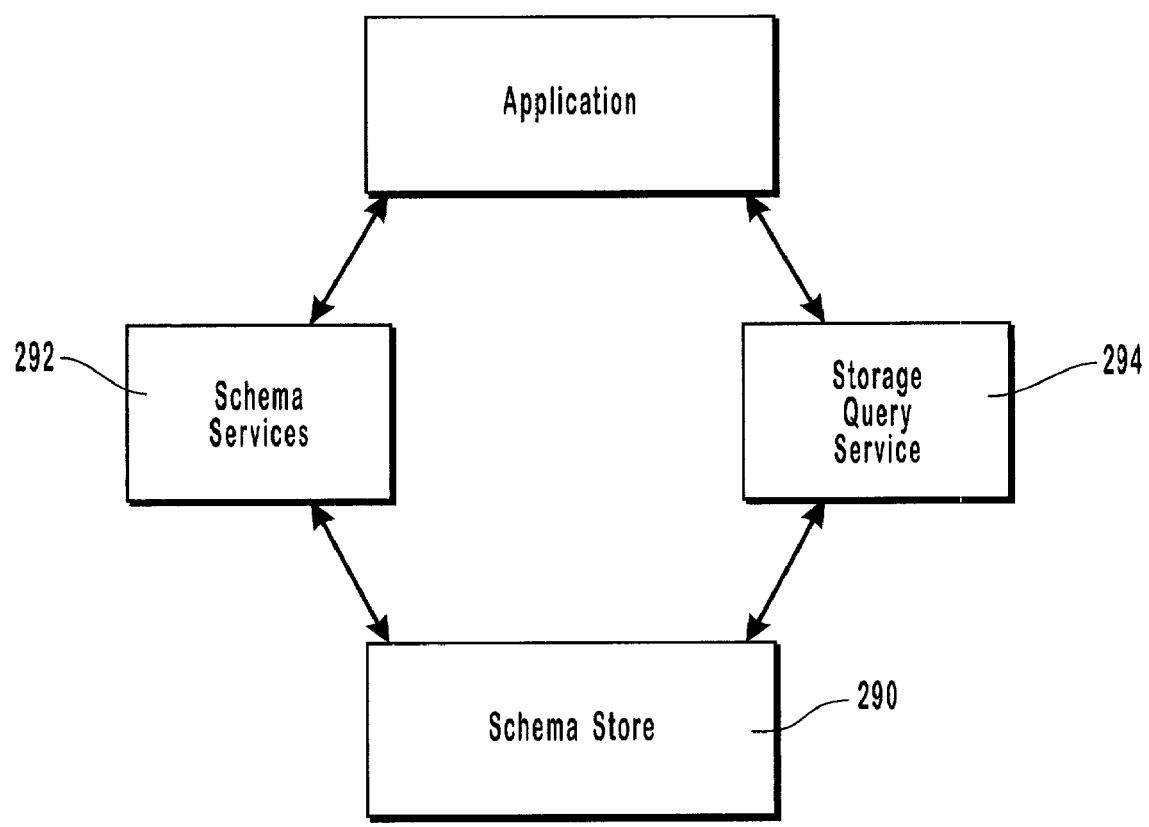
FIG. 3 illustrates a schema store and schema services in accordance with the present invention.

The schema component 170 also provides several schema services 292 that are used to store, find, query, publish and share schema information and data. Referring to FIG. 3, a schema store 290 is a location where schema information is collected and shared. For example, the schema store 290 may contain descriptions of core schema types and mappings between known schema and core schema types. In one embodiment of the invention, the schemas are XML schemas and are described in the schema store 290 by a schema description language. (One example of a schema description language is XSD, which may be extended for use with the present invention). The schema store 290 is an instance of a storage component 145 of the present invention (which is described in more detail below). Thus, the schema store 290 may be distributed throughout the server federation 120. Although the schema store 290 is not the only place where applications may store schema, by storing schema in this location, an application can guarantee that schema services 292, and applications that use them, will be able to discover and work with that schema. Applications may also replicate and store schemas locally and update them using the schema store 290 and schema services 292, as described in more detail below. Access to the schema store 290 and schema services 292 could be controlled by the various security authentication, authorization and firewall services provided by the security component 165.

Schema services 292 generally include schema registration services, which are mechanisms for applications to store, find, query and publish schema information. For example, schema store 290 may collect and reference various schemas via, for example, schema registration service that may include, for example, a schema registration API (application programming interface). The schema registration service allows applications to add or remove schema information from the schema store.

Schema services 292 may also include schema update services which allow administrators, operating systems, or other background schema moderators to update schemas. Schema services 292 may also include a distributed schema service to fetch schemas that are not persisted in the store by following references in the instance data. To facilitate this services, schemas may be stored throughout the server federation 120 in accordance with the storage component 145 and the eventing component 155 can be used to notify applications when new schemas are published, thus allowing global distribution of schema. The schema services 292 may further include a schema validation service to maintain integrity and consistency of the schema and mappings in the store. This service provides structural validation of the schema description language, checks for redundant and conflicting entries, and consistency verification of associations between schemas. The schema store 290 will also rely on the eventing component 155 of the present invention to provide notifications of changes to schemas. The schema store 290 may also rely on the messaging component 160 of the present invention as a transport to distribute updates, events, subscriptions, and notifications.

For example, a local schema store can subscribe to a schema update service to update core types and schemas. One configuration uses an object manager to support registration for schema events allowing an interested user to detect when some relevant schema change occurs. The local schema store can subscribe to one or more sources for updates. The update service(s) pre-populates the schema store with core types, such as people and time, and mappings of common schemas, such as MAPI, vCard, LDAP, and WMI to these core types. Enterprises can host a similar update service to maintain the schema stores within their organization network.

Schema transformation services (also part of schema services 292) enable applications that use different schemas to share meaning. Example schema transformation services include schema adaptor service, schema recognizer service, and schema mapping service. Schema transformation services allow applications to dynamically support new schemas by providing shared mechanisms to recognize data and by transforming data in one schema to another schema. The schema transformation services make it easier for applications to understand a wide range of schemas, increase robustness and consistency across applications, and allow applications to dynamically support new schemas by providing shared mechanisms to recognize data and to transform data in one schema into data in another schema.

For example, a schema adaptor service makes it possible to work with data that is not structured in a standardized language such as XML. The schema adaptor service receives non-XML data and converts it into XML data or any other type of data that is used to communicate with schemas.

A schema recognizer service identifies the schema type of a data instance so that an application knows what to do with the data. The schema recognizer service receives as input XML data or plain text. For XML, the schema recognizer service queries the schema store 290 using a standard storage query service 294 to determine the schema type, using the XML namespaces to narrow the list of possibilities. To infer the schema type from plain text, the schema recognizer service relies on natural language services, which may in turn use the schema store 290. Once the schema type is known, an application may use this information to provide its own user interface or enable a system-wide user interface.

A schema mapping service takes XML data in one schema, transforms the data based on mappings defined in the schema store 290, and returns the data in an XML representation of another schema. In one configuration the schema mapping service is used by applications with writing import or export functionality, often in conjunction with the schema adaptor service.

Schema persisted in the schema store 290 may describe the applications, scripts, components, method bindings or data sources that can be used to act on or represent a specific schema type. For example, an application may provide a standard user interface to display data of a specific schema type, while another application may have business logic to operate on that data. Which action is appropriate for a given scenario is dependent on the users preferences of context. These schema services cooperate with the user interface component 140 to enable several end user features, such as action menus, auto-complete, and smart clipboard drag-n-drop (described below)

The action menu feature presents a choice of available actions on a piece of data in any application. In one configuration, these available actions are presented in a "factoid" fashion allowing the user to choose or ignore them. An application queries the schema store 290 using storage query service 294 for registered actions related to a specific data type. The retrieved actions are used to generate the action menu. For example, when a user clicks on an address, the application queries for type "address" and the schema store 290 returns actions as "Print an Envelope" or "Map this Address" that are populated in a context menu. An action menu API allows developers to expose this menu and other application-specific actions in their applications. Pre-populated action menus for each core type in the schema store may be exposed in the operating systems, Internet browsers, and various active applications.

The schema services could also enhance existing "auto-complete" features, which make it easier for a user to fill out data fields in web forms and documents by presenting choices from a data source listing possible values. The list of possible values presented to the user could be based on registration in the schema store 290. For example, when filling out an "Evite" or "electronic invitation" to invite friends to a party, the email address field would provide a list of addresses from a user Contact List, which was bound to the email address property through the registration in the schema store 290. This same functionality could be exposed through other applications to offer auto-complete in letters, invoices, spreadsheets, mailing lists, databases, or other documents. The same list of values would be displayed in any application that choose to expose this functionality.

Smart clipboard drag-n-drop uses schema transformation services to allow data to be exchanged between applications that use different schemas. Thus, schema transformation service enhances existing drag-n-drop and clipboard routines to move data between applications that support different schemas, while preserving a shared understanding of what the data represents.

Thus, the schema component, working in cooperation with other technology components of the platform 115, such as events, messaging, storage, schema, security, etc., provides a mechanism to share meaningful information across the client and server devices.

E. User Interface

Figure 4:
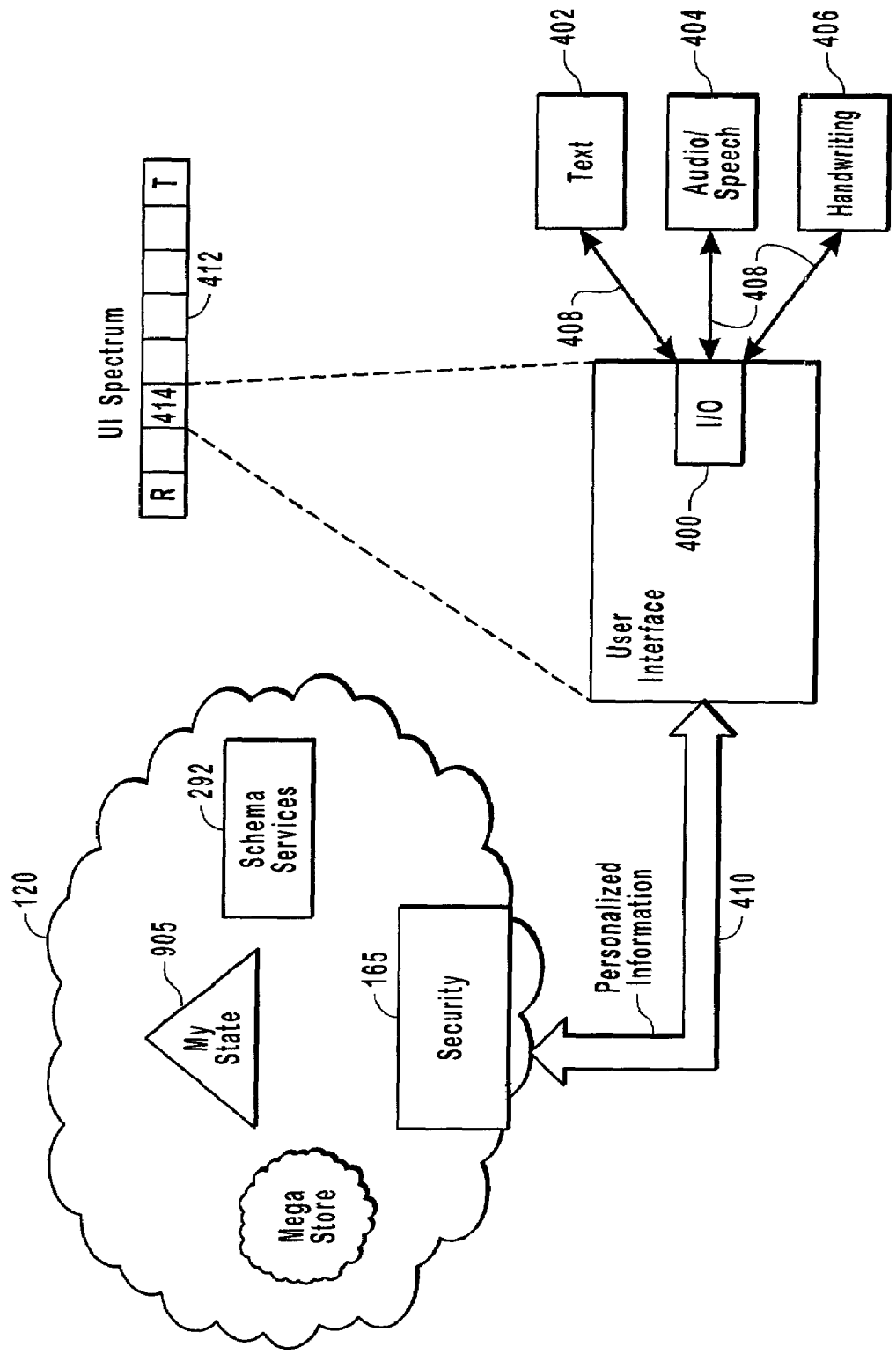
FIG. 4 schematically illustrates a user interface component in accordance with the present invention.

The user interface component 140 of the platform 115 of FIG. 1 provides a multi-modal, responsive, and intelligent user interface across a variety of client devices. FIG. 4 schematically illustrates the user interface component 140.

The user interface component 140 provides a multi-modal user interface (UI), meaning that the user can interact with the UI through multiple modes and the modes can be seamlessly changed on-the-fly. The user interface component 140 includes an advanced input/output component 400 to allow multi-modal input and output. The input/output component 400 may receive user-entered input using "traditional" methods such as keyboard entries or mouse clicks. For example, the input/output component receives text 402. In addition, however, the UI also allows other input methods, such as audio/speech input (e.g., audio/speech 404) for devices that are equipped with microphones, stylus/touch input for devices that are equipped with touch screens or pads, and handwriting input (e.g., handwriting 406) for devices that have handwriting input capability. As represented by the bi-directional arrows 408, the input/output component 400 is also capable of providing traditional output such as text 402, as well as unconventional computerized output such as audio/speech 404 and handwriting 406.

The input/output component 400 also incorporates various conversion technology especially useful in inputting information to a device. Such conversions include speech-to-text technology which converts the users' audio/speech input to text. This conversion is helpful when the user is unable or it is inconvenient to enter text using traditionally typing such as when the user is driving a vehicle or otherwise lacks the ability to type. Another conversion useful to input includes handwriting-to-text technology which converts the users' handwritten stylus/touch input to text. This conversion allows for text to be entered when a text entering device such as a keyboard is not included with the device.

For example, a personal computer in the form of a tablet (i.e., "Tablet PC") is a device which allows handwriting input by writing directly on the screen using, for example, a stylus. The Tablet PC may then use the input/output component 400 to convert the handwriting into text so that the text may be edited in a way not possible with handwriting on paper. For example, spaces could be inserted between paragraphs to allow for comments to be inserted. The Tablet PC may display either the handwriting itself or the text of the handwriting as desired.

The input/output component 400 may also present data to the user in multiple modes beyond the "traditional" text and graphical display. For example, the UI may incorporate text-to-speech technology, which converts text (such as a typed email message) to audio ("reads" the message through speakers on the device). Also, voice mail may be incorporated into a unified messaging shell along with text-based e-mail messages. Speech to text conversion allows this voice mail to be converted into text if desired.

The multi-modal user interface allows the user to interact with various devices based on the user's state and proximity. For example, while using a rich client such as a PC, a user may choose to have her messages displayed through video/audio and reply by text. However, while in her car, the user may choose to have her messages played only by audio and also reply by audio.

This natural language communication is enabled based upon user specific unified user interface portal concepts. Exemplary unified user interface portal concepts include the analysis of an input string, the concept of matching via logical form matching, the generation of an appropriate language-like sentence along with the results, helpful feedback based upon customized search parameters for the user, and search infrastructure capable of smart execution over multiple disparate database stores, with a priority set to the user's traditional storage locations.

In addition to being multi-modal, the user interface component 140 is responsive in that it adapts and/or changes based on the user's state and context across a number of client devices 110. For example, the user interface will be configured and rendered according to the user's preferences and session status so that if the user switches mid-session from one client device to another, the user may continue the session using the other client device with the user interface appearing consistent (although possibly modified, as discussed below) across client devices.

Referring to FIG. 4, the preference information may be stored in the MyState adapted directory 905 in the server federation 120. As a user works on a client device, the session status information is regularly updated in the MyState directory 905. When the user switches to another client device, after proper authentication using security component 165, the preference and session information are provided to the new client device. The preference information allows the display of the new client to appear consistent with the old client. Furthermore, the session state information allows the new client device to continue in the session where the old client device left off.

The user interface also scales appropriately and smoothly to the technical capabilities of the client device. For example, mobile telephones have obvious technical limitations in their user interface due to space limitations for input keys and display area. The user interface for these mobile telephones would be scaled down so as to emphasize only the more important features of the user interface. Thus, a user may migrate mid-session from a rich client personal computer to a thin client mobile telephone, although the user interface of the mobile telephone will provide a more restricted user experience of the session. This smooth scaling between client devices may be accomplished through the use of the manifest supplied by the code management component 175 and described in detail below. For example, the manifest may describe the minimum user interface features required to be displayed on the client device and then describe a priority of user interface features to be displayed when all components cannot be displayed on the client.

Referring to FIG. 4, there is a whole spectrum 412 of user interfaces available for a client device depending on the capabilities of the client device. The spectrum includes very rich interactive UI page components (e.g., page component T) for client devices with well developed multi-modal capability, and available processing power. The library also includes thin page components (e.g. page component R) for clients having less developed user interfaces and lower processing power. The user interface UI shown in FIG. 4 is drawn from a page component 414 somewhere in this spectrum 412.

Also, the user interface responds intelligently to user activity. For example, as described above, the user interface component 140 cooperates with schema component 170 (and schema services 292) to provide action menus of "smart tags" to the user. If the user types on an address (either in a Web page, document, or a contacts list), schema services 292 allows the address to be recognized as an address and thus provide a hot tag. The smart tag may be represented by, for example, marking the recognized item with a distinguishing mark such as a blue dashed underlining.

The user may then select the marked address by, for example, right clicking on a mouse to obtain an action menu that is appropriate for the type of item recognized. For example, an action menu for an item recognized as an address may offer the ability to see a map, print an address label, add to a contacts list and so forth. One of the appropriate actions might include using the address to find more information such as, for example, maps encompassing the address. In so doing, the user interface may consult a mapping service made available through the directory services component 150.

Also, the user interface may detect that the user is typing and thus focus user interface features on word processing activity. For example, the typing may trigger events that result in the user interface determining that the user is likely intended to perform word processing. Such event triggering and inference building is provided by the events component 155.

The user interface may also have a unified command line, which may be used to perform a search, navigate to a Web site, access a file in a file system, or perform a natural language query or command. In a preferred embodiment, the unified command line would be provided in some form on every type of device. In performing a query, the user interface component 140 uses an intelligent feedback process to provoke clarification or seek confirmation for execution of commands, controls or logical processes. For example, the user may type "How's the market doing today?" in the unified command line. There is some ambiguity and/or vagueness in this question. The user interface component 140 may then respond by speaking "What index are you interested in?" The user may then type in the command box "Dow Jones." The user interface component 140 then has enough information to speak a reply. In order to return the information requested in the command line, the user interface component 140 must cooperate with the storage and messaging components to retrieve the information.

The unified command line may also be used to perform natural language command. For example, a user may type "schedule a meeting with Joe Doe for 3:00." After the user interface component 140 clarifies the date, duration, and place of the meeting, the user interface then consults the calendar of Joe Doe if such access has been granted by John Doe. If the rules and preference established by John Doe allow for the meeting to be schedule at the requested time, place and for the requested duration, the meeting is scheduled in both John Doe's calendar and the requester's calendar.

The unified command/search line parses and brokers out the query or command to services provided both locally and on the network. It exists in one place in the user interface, accessed the same way, no matter where they are, and all forms of input—typed (keyboard), spoken, handwritten may be received by the user interface. All levels of intelligence—keyword, Boolean, and natural language (fragments, noun phrases, and/or well formed sentences) may also be received and processed by the user interface.

The user interface component 140 may provide a single unified shell that recognizes that an end user is one person with many roles such as, for example, student, employee, manager, financier, patient, parent, consumer, and pianist. The user interface via the single unified shell brings all these roles together creating a rich, seamless experience.

The unified portal of the user interface component 140 allows the end user to customize and control the settings of the unified portal, including the establishment of project priorities, thereby minimizing the visual separation between the operating system, documents, and applications used for various activities.

Through this customization, the user interface component 140 intelligently populates and lays out the page. This customization is stored in the MyState directory 905 in the form of preferences. Once a user logs onto the client device and authenticates to the security component 165, the federation of server 120 cooperatively obtains personalized information (possibly stored in the mega-store of the storage component 145) following these preference and provides the information to the user interface over the link 410.

The user is also permitted to customize and control the settings of the user interface component 140 to include an awareness of the user's working state and adjust the appearance of the user interface accordingly. Exemplary working states that might require different user interfaces include: when the user is at the PC working, when the user has gone from the office, when the user is accessing data via a PDA or wireless telephone, when the user is working from home, or other location or electronic device attached to server federation 120.

The user interface also enables the end user to instruct a device to collect data relative to the user's prioritization, including the ascertaining of messages and prioritization. For example, the user may set a preference that messages from their boss should always be given high priority and they should be interrupted to receive them. Thus, notifications from the event component 155 that messages are received may be filtered based on these preferences. The unified shell also enables web-based communities to contribute data from individual PCs into the community project. This is particularly useful in work communities as it allows a manager to have the ability to control the content from his PC portal.

Window sharing and document sharing are also enabled, such that when a user is in communication with someone on a communication list, either party may activate window sharing or document sharing so that the other individual may view the window or document in question. Such window sharing may be accomplished by accessing a document in the mega-store in the server federation, and configuring the security settings so that others may have appropriate access through the security component 165 to the document.

The user interface also creates ad hoc templates that allow a user to quickly make reuse of existing reports and other data structures. The templates may be published, distributed, or shared through the unified portal with other members of the work community or published on the Intranet or Internet. Template generation can be a useful feature when working in an electronic work community permitting each participant to contribute to the final product. Certain templates will request specific information from each work community participant to finish the report.

The user interface also enables the use of "buddy lists" with predetermined settings for how listed individuals may be connected or reached. Exemplary connections include electronic mail, telephone, facsimile, address information, video conferencing requirements, wireless communication portal, or other communication mechanism. These "buddy lists" are generated by the event component 155, which triggers an event when an individual logs onto a particular device. The user interface component 140 receives these events and presents them to the user. Finally, the user interface allows for standard personal and calendaring schema to be utilized such that disparate systems may communicate seamlessly.

The user interface supports the use of personal devices, conference awareness of user object in associated security settings, documents sharing with both local and distributed participants, the ability to move documents on a local device for instant access across a web, the response to handwriting annotations made at the unified user interface portal, and, finally, the triggering of notices as a result of event calendaring.

The user interface is a central place for users to move seamlessly between applications and communications. Single, unified edit/control or edit and control, allows for the same place to host a query over a specific structured database. The system is given an awareness of application state and the ability to access appropriate application models.

The system provides a "personal portal" for providing access to applications and services on the PC. For example, it uses knowledge of user schema to intelligently populate and lay out the page. It provides the key linkages users need for navigating personal, shared, and global information, and for running their computer.

Thus, the user interface is multi-modal allowing flexibility in receiving input from a user and providing output to the user. The user interface is also responsive in that it scaled appropriately to the capabilities of the client device and allows for user to switch client devices mid-session. The user interface is intelligent in that it infers intent behind user action and takes appropriate actions such as providing a smart tag with an associated action menu suitable for a particular item when the user interface recognizes the particular item.

F. Events

The event component 155 of the present invention transparently facilitates the distributed communication of events between any software component that publishes or generates events ("event source") and any software component that subscribes to or receives event notifications ("event sink"). In this description and in the claims, an event is an observation about one or more states such as, for example, the status of system components, the activity of a user, a measurement of the environment, and so forth. The event system enables software components and architectures to have access to continually updated information about their context.

Figure 5:
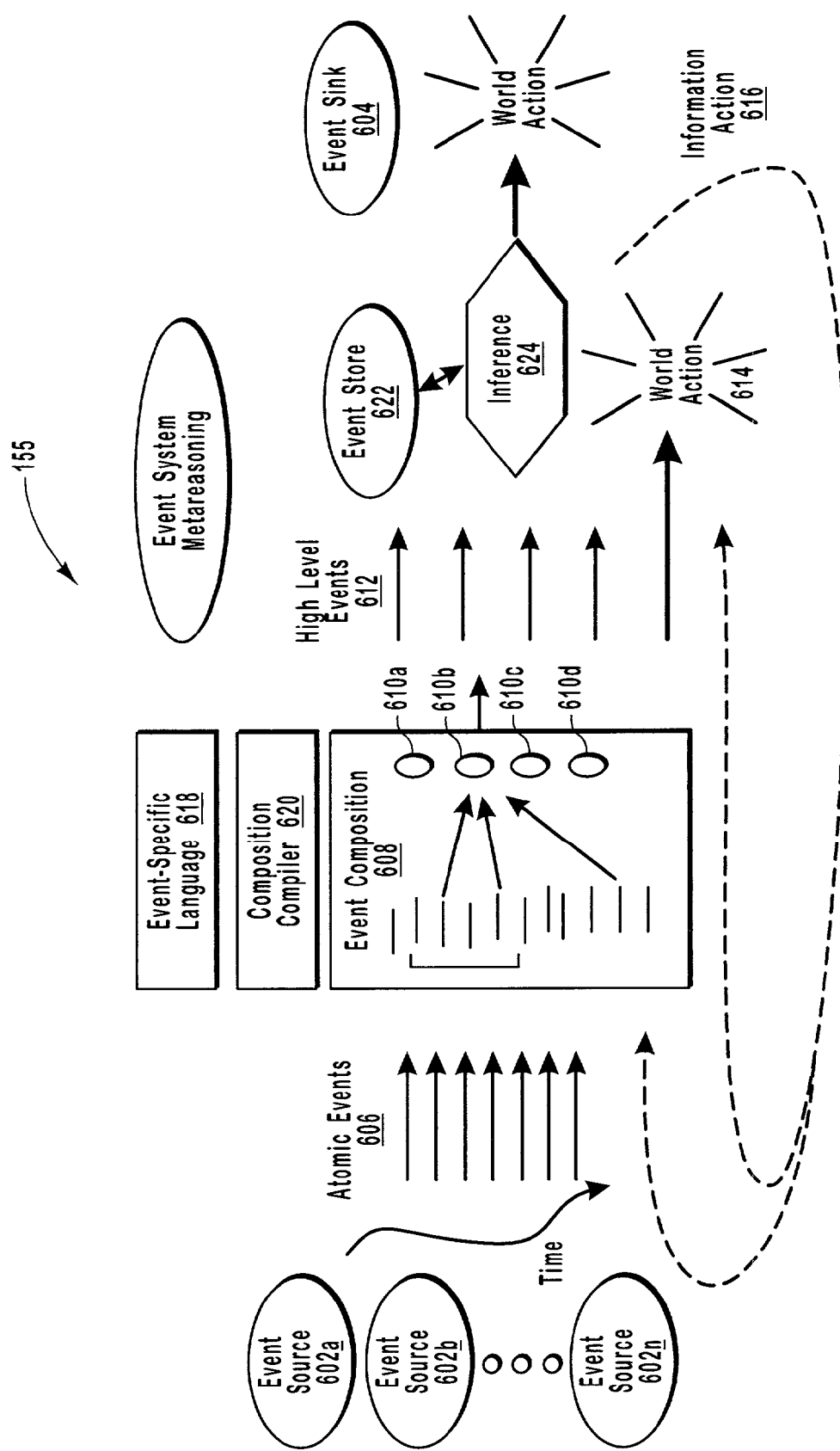
FIG. 5 schematically illustrates an event system that provides event notifications between a plurality of event sources and a plurality of event sinks in accordance with the present invention.

FIG. 5 illustrates generally the event component 155 that provides an exemplary communication of events between one or more event sources and one or more event sinks. An event is generated at an event source 602 in a variety of manners. An event may be generated by an event source 602 as a broadcast or a directed communication to an event sink 604. An event sink 604 may listen or actively poll an event source 602 in order to receive an event. Furthermore, an event sink 604 may subscribe to an event source 602 or alternatively listen to events that are forwarded from intermediate points in the server federation 120.

The event component 155 transforms fundamental or atomic events 606 provided by event sources 602 into progressively higher-level events through an event composition mechanism 608. The process of event composition is the construction of new events or actions from a set of observed events and/or stored event data. Event composition may be driven by rules, filters, and by more advanced pattern recognizers spanning a spectrum of sophistication all the way up to rich inferential machinery. Thus, event composition adapts the set of available atomic events 606 into observations 610 that are appropriately matched to the informational requirements of software components, providing them with information at the right level of abstraction to make good decisions.

Event composition 608 aggregates, filters, and transforms lower-level events (atomic events 606) into higher-level events 612 and, at times, maps the events directly into actions, such as world action 614. The actions include real-world actions 614 and information-gathering actions 616 that serve to gather new events via actively polling or listening. Event composition 608 provides methods for combining events and data, whether the events are observed in close temporal proximity or at widely different times. Event-specific language 618 and composition compiler 620 may be used for building composition components. Event composition 608 may employ a variety of methods, ranging across a spectrum of sophistication from simple rules and filters to richer temporal pattern matching and frank logical and probabilistic inference in order to combine the events and data.

Consumers of events, such as, by way of example, event store 622, perform inferences 624 from sets of low-level (atomic events 606) or higher level events 612 and take actions based on these inferences. The inferences 624 can range from the simple re-transmission of the information to logical, Bayesian, and decision-theoretic inferences. For example, a stream of events about a user's location, activity, and active devices can be analyzed by a Bayesian model to provide a set of probabilities about a user's goals that can be used in turn to make ideal decisions about the most important services and notifications to provide to the user. While FIG. 5 illustrates event composition 608 as being separated from event-based inferences 624, sophisticated composition mechanisms for composing high-level events from lower-level events merges conceptually with inference for decision-making.

The event component 155 provides that events can be distributed, registered and accessed across the server federation 120 and client devices 100 and for "metareasoning" to occur about different aspects of the overall event system and subsystems that endow the system with the ability to do self-monitoring, control, and throttling of event communication and reception. Metareasoning refers to methods and inferential machinery that ensure the health and maintenance of the event system.

The event component 155 allows any event source or sink to publish, subscribe, or listen to events being broadcast widely or within scoped domains. This requires intelligent distribution of the subscriptions, decomposition and placement of the compositions at intermediate nodes in the network, and routing. The event component uses the security services of security component 165 to allow event sources, event sinks, and intermediate nodes to be able to delegate capabilities.

The event component 155 is designed to facilitate interoperable communications and prioritization among otherwise incompatible event sources and event sinks, while maintaining the highest degree of individual sink/source privacy and overall system security. The event component 155 includes, but is not limited to, publication and subscription systems, an event composition mechanism, an event routing mechanism, event storage and logging mechanisms, and event system metareasoning. The event component 155 also uses schema and schema services provided by schema component 170 and communication protocols and quality of service provided by messaging component 160.

Event schema is a collection of class descriptions and the relationships among these classes that define the physical event structure. The relationships among classes include an event class, source, target, semantics, ontological content information, observational reliability, and the quality of service attributes known by the event source. In a preferred embodiment, the class descriptions are XML based schema classes.

Event descriptions use a schema description language for expressing their structure and constraints and a declarative pattern language for expressing scheduled behavior and compositional characteristics. Within the schema language, the event structure is simple. Events have a public envelope that is used in pattern matching and routing, and a private body that is used to privately convey end-to-end data. Given this structure, the pattern language is able to use both instance data and schema information in order to capture higher-level semantics and rules with which to create derivative events.

The use of a schema language allows for a greater range of expressions than simple name-based conventions. Individual events are filtered and transformed and multiple events are composed together into higher-level events. The pattern language includes operators for composition and encapsulation, temporal relationships, logical relationships, string manipulation and XML operations, endpoint naming and topology description, and mathematical relationships. The language facilitates the reuse of composition specifications via parameterization.

The event schema is extensible. A strong relationship model based on inheritance allows backward compatible versioning. Event types have well-defined characteristics based on a strong extensible type system. The model is protocol independent described using standard XML vocabulary. In addition to event schema, various services are modeled comprising Distributed Event System (e.g. publisher capabilities schema, subscriber capabilities schema, event forwarding schema, topology, event store schema, composition and filtering, etc.).

Schematizing the services/components of the event service allows for the achievement of interoperability, discovery, and the ability to browse all of the components of the event service. Schematizing also enables the ability to statically analyze/optimize composition scenarios, examine/save the state of long-running composition scenarios, monitor the operations of the event service, and serves as the main foundation for metareasoning.

The event system includes a highly optimized publication and subscription service driven by model-based subscription registrations. The events system allows for flexibility and choice of the service to publish events, such as, by way of example, kernel events (e.g. WDM drivers events) that utilize a kernel driver programming model, non-COM APIs for publishing events (e.g. security audit events, a directory, a service control manager) that utilize a low-level operating system service programming model, classic COM interfaces for normal applications, and high-level COM+ classes that utilize native COM+ programming model.

An "event subscription" is a request that the event infrastructure notify the subscribing component when a certain condition occurs. Examples of such conditions may be "CPU utilization exceeds 90%," "Process A has stopped" etc. These instructions are stored as configuration objects in the schema repository.

Each instruction consists of two parts. A first part specifies the event of interest (filter). The second part specifies action to be performed in response to the event. The filter includes a statement defining the event of interest. A single filter can trigger multiple actions. The action may be driven by a set of user-defined rules. For example, a user may specify that interruptions in a telephone conversation may only occur if she receives email from a certain high priority sender. This allows the user to continue a telephone conversation without interruption, unless the user wants to be interrupted. Thus, a user may balance work and personal time by specifying rules in which work time is to intrude into personal time, and vice versa. In case an interruption is appropriate, the email message would then be provided from the mega-store. In this manner, the user maintains control over her information and time.

The subscriptions may have a configurable lifetime, based on the concept of a lease. Subscriptions that need to outlive a system reboot are stored in the schema repository. However, cheap, short-lived event subscriptions should also be supported. They can be configured with a simple callback and a filter, without requiring the subscriber to implement persistable bindings.

Subscriptions may be point-to-point or are point-to-group. The distributed services are interested in the scenarios of "tell me when any servers in domain X fails over" or "log all security break-ins on all machines in domain X which have application Y installed." So instead of events that occur on an individual machine the distributed application is interested in events that occur in a group of machines that are part of server federation 120. These scenarios require that the subscription be defined once and automatically distributed to all or some of the machines in the group, and that as new machines enter the group, the subscription is automatically applied to them.

Distributed subscriptions to the events in the group are represented by objects in the distributed namespace provided by the directory component 150. Those objects can also include routing configuration that instructs the forwarding service where the events should be sent. When a new machine enters the cloud, the availability of the distributed namespace ensures that all the subscriptions are deployed and events start flowing to the subscribers.

Subscription builders should be able to specify the quality of service ("QoS") required for their subscription. The event component 155 cooperates with the messaging component 160 to ensure that the QoS is satisfied by using appropriate transport parameters and conducting the rest of its business accordingly (for instance, all internal queues must be persistent of QoS if guaranteed delivery is specified).

The number of events generated in the environment can be quite large. Therefore, the cost of event delivery can cause significant operational overhead. In order for the publication service to scale the system, the events nobody is expecting must be discarded as early in the event lifecycle as possible. To accomplish this, an efficient filtering service does a quick validation of the event against the outstanding subscriptions. However, the number of existing subscriptions may also be very large. The filtering service therefore uses an efficient inverse query engine based on mechanisms such as a decision tree.

In addition to filtering events, the event filtering engine provides subscription analysis services to the publishers. The service notifies publishers when a subscriber is interested in their events and when nobody is interested any longer. Provisions are made for publishers to perform any filtering that they are capable of performing, instead of supplying useless events.

Distributed event-driven services include scenarios where individual events are of little significance unless they occur in a certain sequence or coincide with certain data states. Examples of such scenarios are "notify when all backup controllers are down," "notify if a server crashes 5 times while the load is low," or "identify the situation when a user visits more than 5 menus without selection within a horizon of 5 seconds." To detect these combinations the system composes events and data.

The event composition service 608 may be a state machine driven by events and data conditions. In one embodiment, each composition service is internally configured as a combination of objects that describe the state transitions. Because some of the services can be quite complex, a composition language or template may be provided to simplify the task of setting up composition services. The following are exemplary scenarios: Aggregation of similar events (e.g., "Page me on all transaction-failure events occurring on any SQL server in my enterprise, except for those occurring less than 5 minutes after server shutdown"); composition of events and data (e.g., "If an e-mail arrives while I am reading another one, do not bring it up"); calculating state from events over time, (e.g., "What was the trend of my e-mail queue size over the last day?"); and counting and heartbeat monitoring (e.g., "Notify me if there is no mouse movement and no key is pressed in 5 minutes").

G. Messaging

The messaging component 160 of the invention enables client devices 110 and servers 140 to communicate. The term "message" extends to structured data exchanged between applications or other components of the operating environment 100. Examples of messaging include application-to-application messaging, person-to-person messaging (e-mail) and collaborative applications. In accordance with a preferred embodiment, the messaging component 160 is HTTP-enabled, and is compatible with firewall configurations including DMZ, load balancing servers, and NAT services.

In order to facilitate interoperability, the messaging component 160 provides a common messaging application program interface (API) and set of services that layers on top of HTTP, SMTP and/or other transports to provide common semantics to messaging applications regardless of the underlying transport. In this manner, the Internet and other wide area networks are leveraged to provide efficient and ubiquitous messaging, substantially regardless of the transport protocol associated with particular devices, so long as the transports are compatible with the common messaging API.

Moreover, the messaging component 160 is highly scalable both in number of users and connected devices that it can support, and also in the types of devices or networks with which it can be used. In other words, the messaging component 160 readily adapts for use with devices and systems ranging from small wireless devices to "mega-scale" networks and messaging systems. This scalability feature is characterized by the ability to build messaging applications on the messaging platform that allow small devices to participate in high quality of service (QOS) message exchanges as well as sophisticated distributed services. In other words, the messaging component 160 is both highly scalable on the server and can be scaled down to small devices, meaning that it is possible to build appropriate "small footprint" subsets.

In contrast to conventional messaging systems, the messaging component 160 of the invention utilizes a platform messaging architecture. Rather than being a layered product, the messaging services exist as a base platform substrate to which new applications and message-based services, one example being distributed eventing as provided by the events component 155, can be written by the entity that operates the messaging services of the invention or third parties. The messaging component 160 is defined in a manner so as to recognize and embrace Internet-based protocols and to exploit new and existing protocols in a common fashion. Moreover, the messaging component 160 provides asynchronous, connectionless, store-and-forward reliable messaging with exactly-once, in-order message delivery.

The messaging component 160 is targeted at reliably delivering application- or service-defined message "blobs", in contrast to the messaging system being aware or dependent on particular message types, message content, or service protocols. The messaging component 160 does not directly implement data dependent routing schemes, topic or subject-based publish/subscribe infrastructure, or other messaging transformation services.

The messaging component 160 provides a suitable basis for the transport layer of distributed event support. While the messaging services can be further supplemented with additional functionality, the present invention can be practiced without the messaging services defining a full, integrated event system. Moreover, the messaging services need not define integrated high-level discovery message endpoint discovery services.

Figure 6:
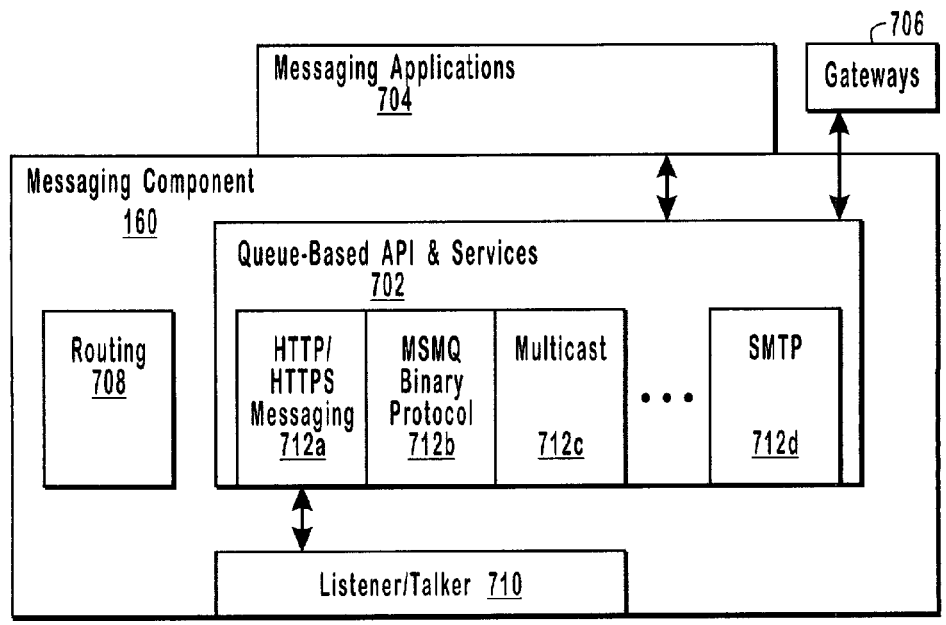
FIG. 6 schematically illustrates a messaging architecture for use with the present invention.

One embodiment of the messaging component 160 is now described in greater detail in reference to FIG. 6. In order to meet the needs for reliable and flexible messaging for applications, users, hardware, etc., the messaging component includes a common API 702 for all messaging activities. API 702 exposes a common developer interface and provides common implementations of shared capabilities, such as authentication, access control, and quality of service guarantees. Messaging component 160 also preferably includes messaging applications 704, gateways 706, routing 708, HTTP communication services 710, and transports 712, which will be described in greater detail below.

The layer designated in FIG. 6 as Queue-Based API & Services 702 (hereinafter API 702 or layer 702) provides a common interface across the different transports and common services. API 702 establishes a simple programming model that enables developers to deliver messages to destinations that can be identified by URLs in one of several URL namespaces. In a preferred embodiment, the fundamental destination construct of API 702 can be a queue, similar to that of the existing MICROSOFT® Message Queue (MSMQ) queue-based API, developed by Microsoft Corporation of Redmond, Wash.

Since the different transports 712 do not inherently have the same level of services built in, many of the services are implemented in layer 702. Because different transports 712 have different levels of integrated services, the interface between layer 702 and the specific transports 712 is fairly sophisticated, since when a transport has inherent mechanisms for features such as authentication or higher quality of service, it is desirable to use them. However, all of the basic capabilities are also provided on top of any transport 712 that supports simply best-effort delivery of arbitrary messages.

According to one embodiment of the invention, layer 702 preferably has associated therewith a range of qualities of service to message deliveries. For instance, express QOS is defined as high-performance in-memory based messaging that is not resilient to message host reboot. Persistent QOS is disk-based messaging that provides at-least-once delivery guarantees. Exactly-once/in-order QOS relates to persistent messaging that provides exactly-once ordered delivery (duplicates are identified and removed, out of order arrivals are rejected).

The security services of layer 702 can enable authentication, access control and/or secrecy services according to the security component 165. For example, authentication may be based on certificates according to an end-to-end model, which can be user-based or machine-based, or can be provided according to other models, including XMLDSIG, MSMQ, Secure Multipurpose Internet Mail Extensions (S/MIME), or other suitable authentication systems. Access control (i.e., who is allowed to deliver to and manipulate queues) may be controlled in a user-oriented fashion based on credentials established in message authentication. Secrecy services (i.e., encryption and decryption) may be established using hop-to-hop secrecy enabled through HTTPS, which implies that intermediate servers are trusted. End-to-end secrecy can be enabled though key exchange protocol.

The messaging component 160 of the invention can be adapted to operate with a variety of both existing and future transports. Indeed, the ability to interoperate with different transports is a primary purpose of the design and existence of API. Although other transports may be used, FIG. 7 specifically illustrates API 702 being used in conjunction with four transports 712, which are examples of transport protocols that maximize reach and functionality. HTTP/HTTPS 712a is a transport protocol that uses a SOAP-based message representation. MSMQ binary transport 712b supports a rich set of QOS. For instance, MSMQ provides a highly optimized binary format that is compressed and enables structured access to message contents. Multicast transport 712c supports applications that need simple messaging with large scalability of recipients. SMTP transport 712d is provided for applications that fit well with the traditional SMTP model. Larger message sizes, and other scenarios typical of email traffic are well suited to SMTP. In addition SMTP has characteristics (both in the protocol and in deployment reality) that make it useful for business-to-business ("B2B") applications where use of the existing infrastructure is desired. SMTP has good performance but fairly low level of additional capabilities, although it supports basic "at-least-once" quality of service and simple authentication.

Gateways 706 are treated somewhat differently from built-in transports 712. Transports 712 generally do not support a fully pluggable model where third parties can add new components. Instead, a gateway 706 receives message traffic for a portion of the URL namespace. Gateway 706 can then connect to other types of communications systems, such as MQSERIES® or the GROUPWISE® email connector.

The messaging component 160 enables message exchange between multiple parties in an interoperable, secure and transparent manner. To do so, a common self-descriptive language encapsulates messaging metadata and payload. In a preferred embodiment, XML is used as description language that addresses these requirements.

Extensibility is important for allowing messaging applications 704 to add value to the underlying messaging component 160 in a seamless manner. For instance, the protocol should have a general-purpose mechanism to introduce application-specific modules. Examples are message tracing, logging and data transformations. This should be exposed as a standard for inserting app-specific elements into an XML document that encapsulates a message.

In a preferred embodiment, the messaging component 160 uses HTTP as a transport, which provides that local "HTTP proxy" services are available. Likewise, the standard HTTP security mechanism (SSL) can be used by the messaging component 160.

In order to scale, the messaging component 160 can take advantage of available load balancing services. For lower qualities of service, messaging is essentially stateless and thus the underlying load-balancing mechanism being used is transparent. However, since higher QOS are inherently stateful, the messaging services provide mechanisms for state preservation across message exchanges, including both external mechanisms (application-specific) and internal mechanisms (generated by the messaging infrastructure). To do so, the messaging component 160 may use a single back-end message store with respect to which end-to-end delivery semantics are preserved and a mapping facility from external addresses to the internal message store address. It is noted that the mapping facility can be provided by the "incoming messaging proxy" service which can be deployed with an Intranet as well as providing an Internet presence.

In general, a messaging host using HTTP as its transport needs the ability to send and receive messages. This implies that it has both HTTP "listening" and "talking" services. In a preferred embodiment, a universal listener provides the basic server-side HTTP protocol support. The universal listener, which is a system component shared by all HTTP servers on a machine, manages port 80 on behalf of all server applications and surfaces incoming requests to them via a universal listener API (UL API). Services and applications, can use the UL API to receive requests directly into their process environment. An optional process management facility is provided for server applications (e.g., Active Server Pages) that want requests to be serviced within system-managed processes.

The universal listener provides a kernel-mode listener shared by all HTTP-based server applications on a machine. All applications can efficiently share port 80. The universal listener can also request parsing and provide a response cache for high performance delivery of static content and "stable" dynamic content. Applications can control caching via configuration and the UL API. Cached responses can be delivered without entering user mode.

The universal listener can further dispatch requests to user-mode "worker processes" based on the longest match URL prefix. These user-mode applications have complete isolation from the core listener component. The worker process can receive and respond to requests using a "UL API." Moreover, worker processes services multiple parts of the URL name space. More than one worker process ("a garden") can service the same set of applications for increased scalability, availability and intra-application isolation.

The HTTP-server process manager is a system component that can optionally be used in conjunction with UL to manage worker process. The process manager provides on-demand launch of worker processes (e.g., triggered by incoming requests). The process manager also can establish worker process "health monitoring" and worker process "cycling" (shutdown/restart) to recover from leaks, hung servers, etc. Cycling can be triggered by time, number of requests received or as a result of health monitoring. Furthermore, the process manager can provide management interfaces for configuration and control and persistent configuration.

In one embodiment, the HTTP client is implemented in kernel mode. Reasons for implementation in kernel mode include 1) performance; 2) communication with kernel components; and 3) listener/talker integration. The benefits of listener/talker integration include performance optimizations and shared implementation.

The messaging systems can optionally implement HTTP protocol extensions, support for which is established in both the listener and talker implementations. One extension relates to a "web mux", which enhances the HTTP connection management to support more efficient connection multiplexing, which can be particularly valuable in high volume B2B scenarios.

As described above, the messaging component 160 provides efficient and reliable messaging using any of a variety of transports, including HTTP. The messaging component 160 is used by the other technology platform components to pass information. The messaging component 160 establishes a standard interface to which developers can write applications and take advantage of the overall architecture of the messaging services and the other features associated with the invention.

H. Storage

In describing the storage component 145 of the distributing computing services platform 155, reference is made to the term "data engine," which refers to any medium that may be used to carry or store desired program code means in the form of computer-executable instructions or data structures, which may be accessed by a general purpose or special purpose computing device.

A data engine may be associated with many types of devices. By way of example, a data engine may be associated with any client devices 110 (desktop PC, a lap top computer, a Personal Digital Assistant ("PDA"), a cellular telephone, a pager client, and so forth discussed above in connection with as FIG. 1). A data engine may also be associated with server devices 140 as, by way of example, application, audio, database, a fax, file, intranet, mail, merchant, modem, network access, print, proxy, remote access, telephone, terminal, video, or Web server, or the like. These servers may be located in the server federation 120.

Figure 7:
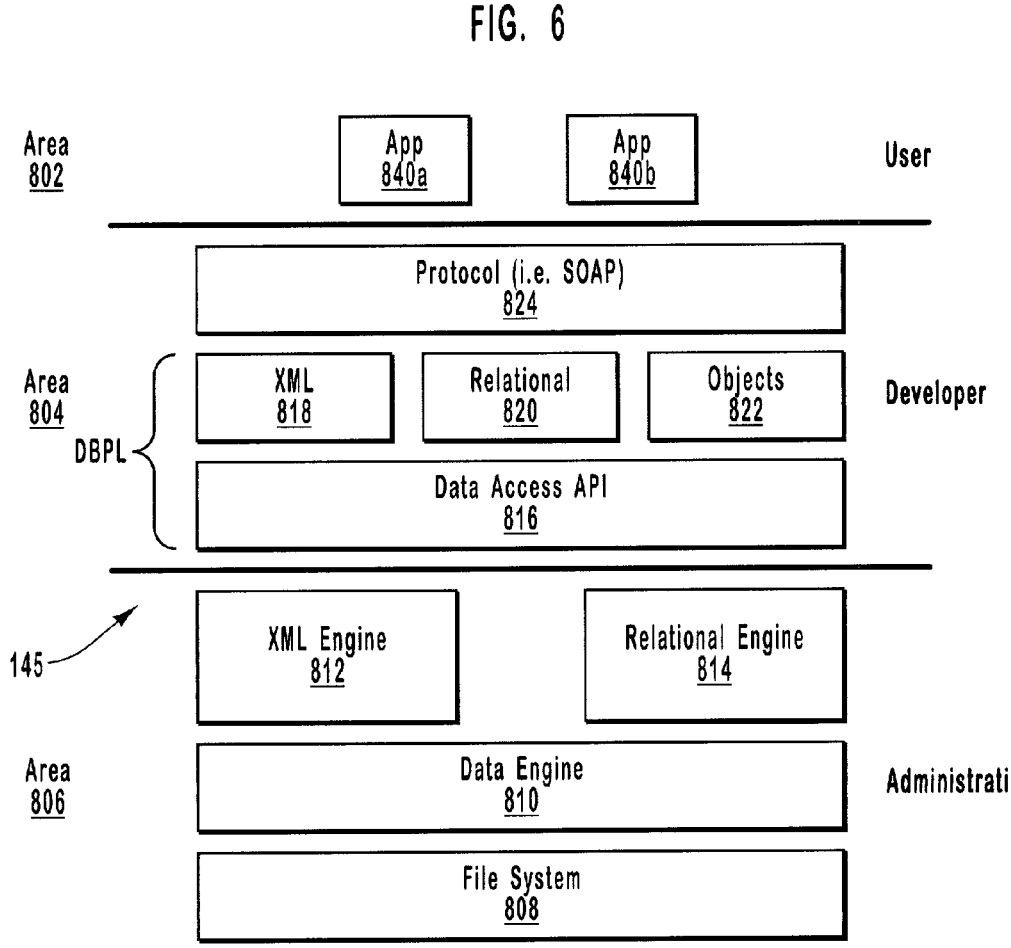
FIG. 7 schematically illustrates a storage architecture for use with the present invention.

FIG. 7 illustrates an exemplary architecture for storage component 145, which addresses the use of a data engine, the accessibility of data, and the execution of one or more applications. Storage component 145 may be separated into three areas generally characterized according to the type of entity that utilizes each particular area. The areas are illustrated in FIG. 7 as areas 802, 804 and 806. By way of example, a user generally utilizes area 802, a developer generally utilizes area 804, and an administrator generally utilizes area 806.

Figure 8:
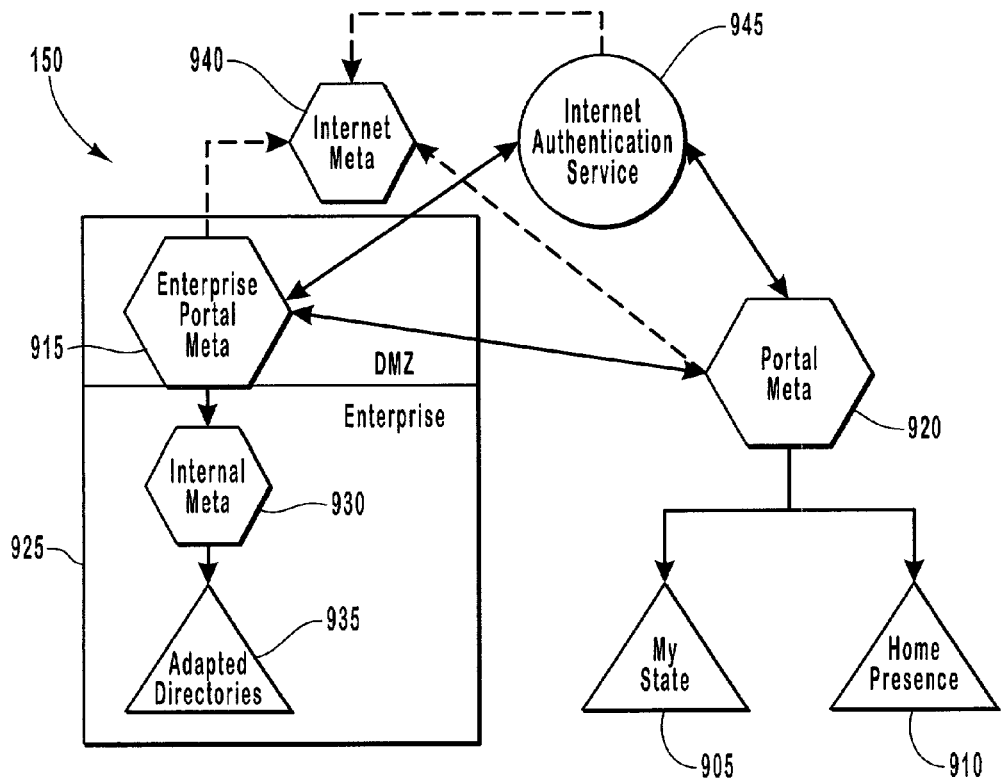
FIG. 8 schematically illustrates a directory architecture for use with the present invention.

The foundation of storage component 145 is a file system of an operating system, such as, by way of example, the MICROSOFT® WINDOWS® operating system. In FIG. 8, the file system is illustrated as file system 808.

The data engine 810 is the heart of the storage component. In a preferred embodiment, the data engine 810 may be a SQL Server Storage Engine based on SQL Server from Microsoft Corporation. Built on top of the data engine 810 are various data models such as, by way of example, an XML Data Model, a Relational Data Model, a Messaging Data Model (e-mail, calendar, group productivity), such as, by way of example, an Exchange Data Model (not shown) based on Exchange Server from Microsoft Corporation. The data engine stores data in the most efficient format. The data models or engines layered on top of the data engine understand how to access the stored data and present the correct view to the developer. The data may be presented in a number of formats, such as, by way of example, in tables, a hierarchy, or a series of name/value pairs. The data models may include one or more engines. By way of example, the XML Data Model includes XML Engine 812. Similarly, Relational Data Model includes Relational Engine 814.

Developers communicate with the various data models through a common query system using a database programming language ("DBPL") technology. The DBPL technology includes Data Access Application Program Interface ("API") 816, which is a format that is used by an application program for communicating with a system. The format employs function calls that provide a link to a required subroutine for execution. In a preferred embodiment, the DBPL technology is based on XML (XML 818), may employ a relational model (Relational 820), and utilizes object technology (Objects 822).

The top layer, illustrated as area 802, includes various applications 840a, 840b, etc. that are used by a user/consumer. The applications cause the integration of, for example, documents, mail, calendaring items, contacts, stock portfolios, customers, orders, media based product catalogs, etc. The applications sit on top of the various data models and talk to the system using a specific protocol 824. In a preferred embodiment, the protocol 824 in is the Simple Object Access Protocol (SOAP) 824.

In a preferred embodiment, the components of storage component 145 are based on XML as the unifying technology such that all types of data are handled as XML documents. The server federation 120 and communications associated with the distributed computing services platform 115 of the present invention are built upon an XML foundation. Messages, method invocation, object description, and the data engine all use XML. Query language works on hierarchies and returns hierarchical XML. Because storage component 145 is based on XML, storage and query operation are the same across the entire data spectrum, from tabular formats to documents.

The storage component 145 is a key component that enables a storage mechanism termed herein "mega-store." In mega-store, the server federation 120 of FIG. 1 acts as a unified storage mechanism from the end-user viewpoint. The mega-store is illustrated by the following scenario. A user walks up to a PC and logs on. This log on authenticates the user with the Internet authentication service provided by the security component 165. After the user is authenticated, the directory component 150 may be used to determine where the user's information is stored. The storage component 145 then retrieves the data and provides it to the user interface component 140. Thus, the personalized information appears in the user interface such as history lists, favorite lists, the inbox, and so forth without requiring further user intervention. Thus, as a user moves from device to device, their data and applications follow them.

The mega-store includes an end-user component and developer component. The end user simply understands that when they log on to a site, their personal data and information is automatically accessible stored for them. As such, there is no need for a user to be concerned with or understand whether their personal data and information is stored, for example in a cookie or on some server in server federation 120. Rather, a user need only understand that wherever they go, whether it be home, work or elsewhere, their personal data and information is easily accessible.

I. Directory

Directories are conventionally enterprise-wide naming authorities that create the illusion that data is compartmentalized in an organized structure when, in fact, the data is often scattered throughout the enterprise. Examples of data that directories contain include address book data such as contact information regarding entities (e.g., users, computers and groups of users), authentication data used to authenticate entities, and authorization data used to control access to objects on a per entity basis. Two kinds of directories include adapted directories and meta-directories.

An adapted directory is a data store that is often adapted to one or more specific purposes. Often the directory functionality is specific to an application. The information stored in an adapted directory is authoritative data or "truth" data (i.e., data not synchronized from other sources), but an adapted directory may also store redundant data (i.e., data synchronized from other sources). Examples of adapted directories will be set forth further below.

A meta-directory is a data store that contains or holds a subset of the objects found in adapted or other meta-directories. For each object, the meta-directory holds a subset of the attributes of that object. The meta-directory also contains references to directories that contain more complete information about the objects. Examples of meta-directories will also be set forth below.

Adapted and meta-directories that have well defined schemas are more easily synchronized than those directories that do not have well defined schemas. Synchronizing adapted and meta-directories is useful because the information stored in meta-directories is often related to the association between related entries in various adapted directories. Often, the data stored in the meta-directory is available or readable by everyone. In some instances, however, more security is required and access to the meta-directory is more controlled.

In order to enable collaboration and communication throughout the server federation 120, the directory component 150 preferably provides a per-portal or per-Web site meta-directories with synchronization between the meta-directories. The directory component 150 includes the use of both adapted directories and meta-directories.

FIG. 8 illustrates the directory component 150 in accordance with the present invention. The directory component 150 includes an adapted directory 905 that is specific to a person or entity and is referred to herein as a "MyState" directory. The MyState adapted directory 905 is used to store information, such as the name, address, phone and the like, about the person or entity.

Since a person may have more than one identity (e.g., a home/personal identity and a work/professional identity), the MyState directory may contain information for more than just one identity for any given user. For instance, a user may have an adapted directory that is specific to a home or personal identity and an adapted directory that is specific to a work or professional identify of the user. An example of an adapted directory that is specific to a home identify is illustrated as home presence directory 910 in FIG. 8.

These adapted directories 905 and 910 are structured according to a schema. Through use of the services provided by the schema component 170, external services and applications can access and extend these adapted directories. The schema, in combination with the security component 165, also allows the user to permit different entities to access particular or specific portions of the adapted directory. Through use of the event component 155 and messaging component 160, the MyState directories are also capable of notifying other entities of changes and updates to the MyState directory as well as terminating a relationship between an entity and the MyState directory.

The directory component 150 also contains portals having meta-directories such as, for example, enterprise portal 915 and portal 920. Portals may be viewed, in one example, as industry wide websites. Thus, there are healthcare portals, shopping portals, music portals and the like. Each portal implements one or more meta-directories to maintain information from related businesses and entities. For example, some of the meta-directories of healthcare portals will contain information about related entities or persons including, but not limited to, doctors, clinics, pharmacies, and patients. The portal meta-directories will maintain or store an object for each authenticated user. Each object may contain, for example, authorization information provided by the user because users that access these meta-directories are often authenticated. The portals also synchronize relationships between other portals and the adapted directories. For example, the adapted directories of a doctor may be synchronized with the adapted directories of a patient through their respective meta-directories or by the healthcare portal.

Figure 9:
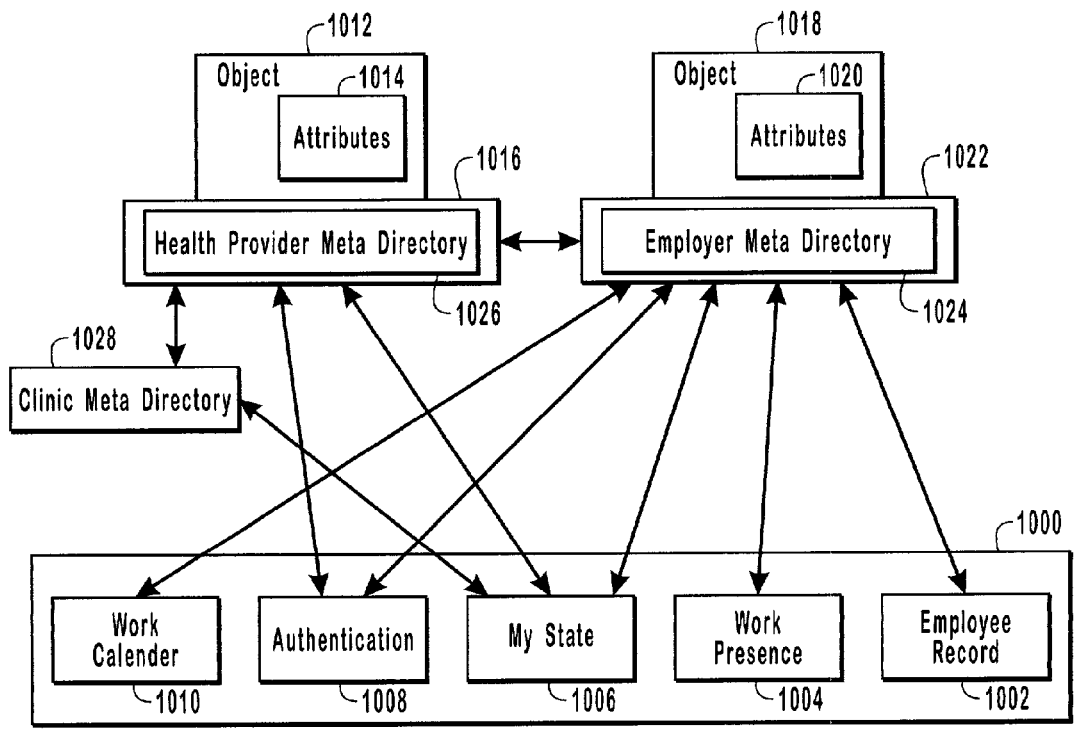
FIG. 9 illustrates an example communication flow using the directory architecture of FIG. 8.

The directory component 150 preferably encompasses various enterprises. For clarity, only one of these enterprises (i.e., enterprise 925) is shown in FIG. 9. The enterprise 925 includes an internal meta-directory 930 and internal adapted directories 935 such as those conventionally contained by current enterprises. Thus, enterprises need just migrate to using a portal such as enterprise portal 925 in order to tap into the vast directory services offered by the directory component 150. By allowing an internal enterprise to migrate to become an enterprise portal, third parties will be able to more easily access the entity's information.

The directory component 150 also includes an Internet meta-directory service 940. The Internet meta-directory service is capable of searching the Internet for data or documents that have a particular schema. This directory could include information such as products a company sells, services a company provides, and so forth. Each document (or subset thereof) is incorporated into a meta-directory, along with the document's URL. Thus the Internet meta-directory 940 may be accessed by applications and services to point them to the information or services they need.

The directory component 150 may use an Internet authentication service 945 (provided by the security component 165) that provides authentication services for the portals as desired. An example of an Internet authentication service 945 is referred to as Passport, provided by Microsoft Corporation.

FIG. 9 exemplifies the interaction between the various adapted and meta-directories. This example is not to be construed as limiting the scope of the invention, but is an example of a portion of the functionality enabled by the present invention. This example illustrates a new employee beginning work with a new employer. The employer has an enterprise portal 1022 that contains an employer meta-directory 1024. When the employee begins work, the employee record directory 1002 is added to the adapted directories 1000, which are also maintained by the employer in this example. Thus the employee record directory 1002 is an adapted directory that contains authoritative data about the employee according to a schema.

The employee record directory 1002 adds the employee to the employer meta directory 1024 and promotes a number of attributes to the employer meta directory 1024. Information between these directories are synchronized by an Automated Attribute Agreement (AAA). Thus, the employer meta directory 1024 has an employee object 1018 with associated attributes 1020, which contain redundant data related to the authoritative data stored in the employee record directory 1002. The employer meta directory 1024 sets up a mail directory (not shown), a work calendar directory 1010 and a work presence directory 1004, which are also adapted directories.

Next, the new employee visits a security office to obtain a security badge. He uses a personal digital assistant (PDA) or other device to register the preexisting authentication directory 1008, which is another adapted directory having, for example, passport keys. The authentication directory 1008 is then linked to the employee's identity or object 1018 in the employer meta directory 1024.

The employee instructs the PDA device to keep the employer updated with personal information such as address, phone, and the like. This is accomplished by establishing an AAA between the MyState directory 1006 and the employer meta directory 1024. The MyState directory 1006 is an adapted directory as well. Because of this connection, the employee's PDA can use the employer meta-directory 1024 to find the work presence directory 1004 presence server and interfaces with that presence server or registers to have access to the employee's universal inbox.

Once these associations and connections have been made, the employee may receive an email from the employee record directory 1002 asking the employee to select a health provider. The employee's selection is stored in the employer meta-directory 1024. Next, the employer meta directory 1024 connects with the health provider portal 1016 and the health provider meta directory 1026 to create an entry for the employee. Thus, the health provider meta-directory has an object 1012 and attributes 1014 for the employee. The AAA agreement between the employer meta-directory 1024 and the health provider meta-directory 1026 can contain different items. For instance, the agreement may include periodic auditing as well as an agreement by the employer meta-directory to forward changes to the health provider meta directory.

The health provider meta directory 1026 sends the employee a Web page asking the employee to select a primary car provider. In return, the employee asks the health provider meta-directory 1026 to supply a list of doctors. After the doctor is selected, the health provider meta-directory 1026 will contact the clinic or doctor portal and create an entry for the employee in the clinic meta directory 1028. The clinic meta directory 1028 sends an email to the employee requesting the employee's medical records. The employee is able to release only the medical information portion of the MyState directory 1006 to the clinic meta directory 1028. This enables both the employee and the clinic to both maintain a complete set of records. Simultaneously, the employee may approve sharing their calendar with the doctor, who may reciprocate. Finally, the clinic meta-directory 1028 may signal a workflow service to schedule a first appointment with the employee using their mutually accessible calendars.

Again, the authoritative information stored by the adapted directories is therefore linked by the meta-directories in this example. It is understood that the clinic, the employer and the health provider also have various adapted directories. Those directories and their interaction with the meta-directories has not been illustrated in FIG. 10. The meta directories can store redundant information or hint information that relates to the authoritative information. The schemas of the adapted directories can allow other meta directories to access particular portions of the adapted directories. The authoritative and redundant information is synchronized to ensure that the data is up to date.

In FIG. 9, each of the adapted directories in the adapted directories 1000 has a certain purpose or set of purposes. The employee record directory 1002 represents a work identity while the MyState directory 1006 represents a personal or home identify. The authentication directory 1008 adapted directory may contain information such as passwords and the like that is used to authenticate a person. The work calendar directory 1010 is a calendar or a contact list. Using adapted and meta directories as shown in this example enables improved communications between entities. Communication is enhanced in this example because the employee is not required to interact with each separate portal. The directory component 150 allows the communication to occur automatically because they are all connected and linked via the messaging component 160.

J. Security

As discussed previously herein, over the past few years there has been rapid adoption of the Internet by consumers and businesses alike, with an associated dramatic increase in the use of Internet-based services. The present invention allows greater Internet connectivity and collaboration, with increased inter-Web site communication. Unfortunately, as the number of users of the Internet and the Internet-based services increase, consumers and businesses grow more concerned about security and privacy issues. For example, many consumers and businesses rely on various Internet Service Providers (ISPs) who may track consumer and business on-line activity in considerable detail. Many consumers also use multiple service providers with whom they have widely varying business relationships and implicit trust (subscription, transient transactions, none). Furthermore, with the increasing use of 'always on' Internet connections (digital subscriber lines (DSLs), Cable Modem), multiple Internet capable devices (personal computers (PCs), Cell Phones, personal digital assistants (PDAs)), and multiple home networked devices that may interact with each other in quite distinct ways from the Internet interaction, consumers and business achieve greater connectivity, while increasing the number of access point for unscrupulous individuals or business to "obtain" personal and/or confidential information.

Figure 10:
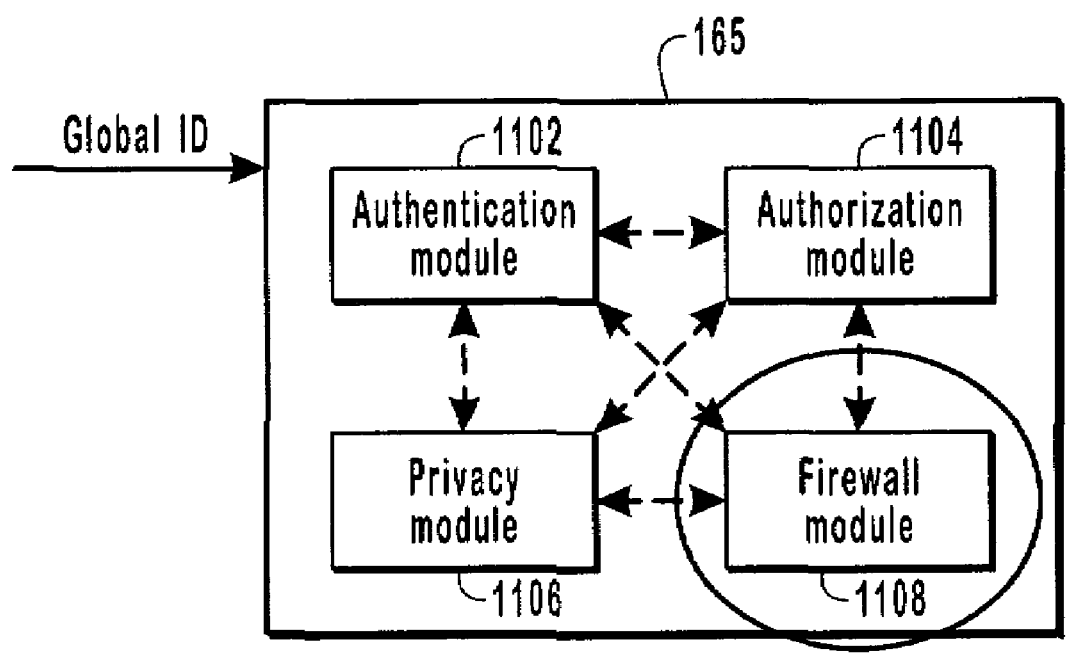
FIG. 10 schematically illustrates a security service for use with the present invention.

To minimize the above-described limitations, the present invention optionally includes a security component 165 that provides a number of security protection tools such as, for example, authentication, privacy, and firewall security boundaries. FIG. 10 is a schematic representation of one embodiment of the security component 165 of the present invention. The schematic representation of FIG. 10 is illustrative of the optional functionality of security component 165 and does not limit the applicability of other functionality that would be appreciated by one skilled in the art in view of the teaching contained herein.

According to one aspect of the present invention, security component 165 includes an authentication module 1102 that includes various hardware and/or software components used to perform an authentication process of entities accessing information and data within server federation 120 and client devices 110 (FIG. 1). The entities may access the stored information and data, for example, when the entities are involved in multi-party interactions, whether consumer-to-business or business-business, including a wide range of configurations and transaction participants.

More specifically, in one embodiment, authentication module 1102 includes hardware and/or software modules that controls entity's access to page component 210, emissary component 220, and/or fiefdom component 230 (FIG. 2), while preventing "repudiation" of or hiding of the entities identity from other users Or entities of system 100. The terms "entity" or "entities" used herein includes not only users (individually or in groups) but also machines, authorized software arbiters, servers and proxy services, various other hardware and/or software modules and components, and the like.

In order to determine whether an entity is the entity that they are portraying themselves to be, whether it be a consumer, business, hardware module, or software module, each entity is to have an identifier, termed a "Global ID." Each Global ID corresponds to one of the various "identities" that a person, or other entity may choose to assume. Most people (including other entities) will have a minimum of two identities: an identity that is affiliated with their occupation (student, employee of some organization, etc.), which will be used when conducting business-related activities, and a personal identity to be used for other interactions. Additional identities are available for users in order to maintain privacy or to account for the needs for higher levels of assurance associated with some of their interactions.

The security component 165, in combination with system 100 and/or application 200 will manage these identities and associated authentication credentials, insuring that the identities are kept separate, while providing a user experience that allows end users full control over how their identity is used and the level of privacy and confidentiality associated with each identity.

Figure 11:
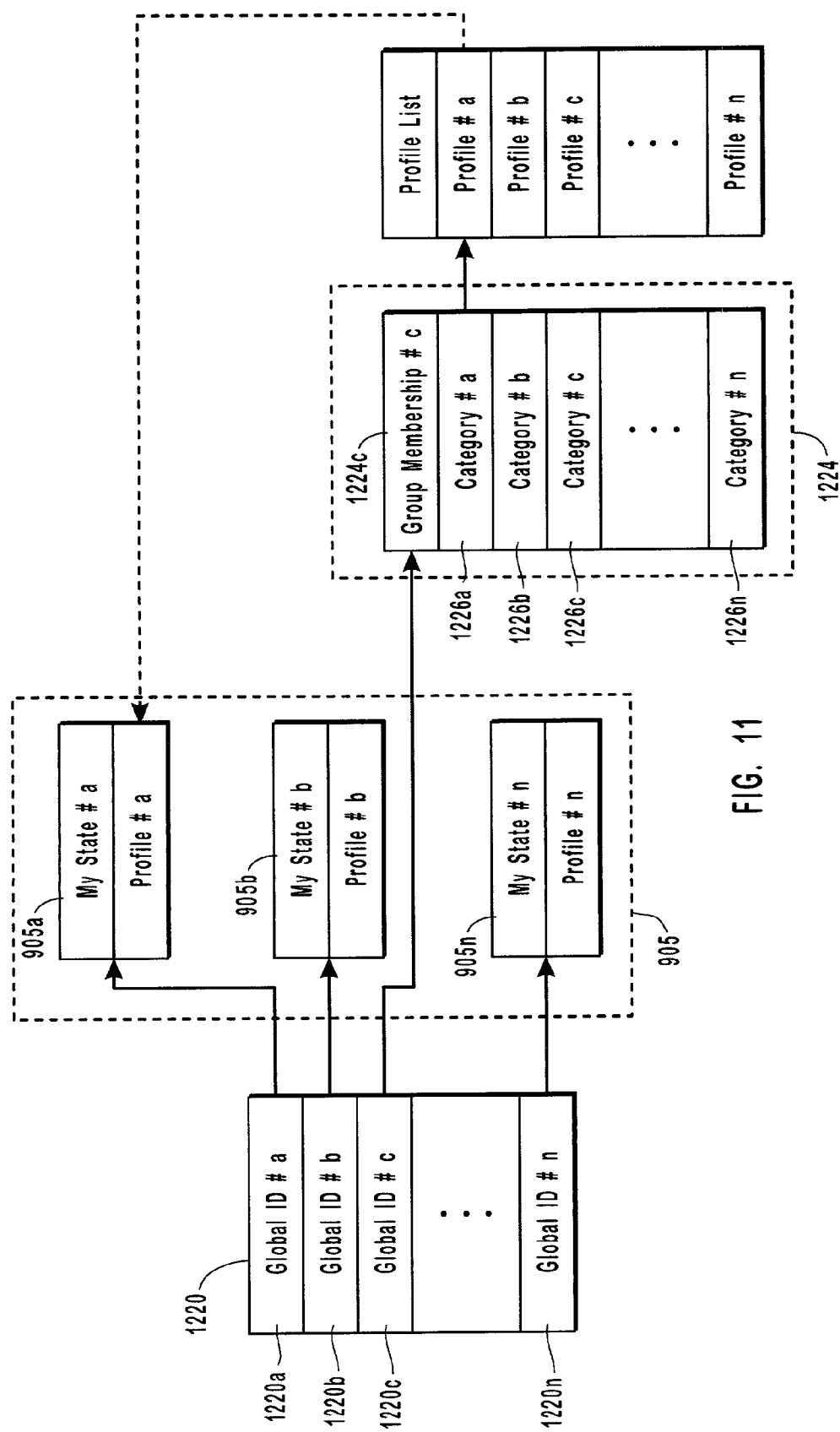
FIG. 11 illustrates a data structure showing how global identifiers are used to maintain profile information.

Referring now to FIG. 11, a schematic representation of the interaction between the user's Global ID and various other illustrative services and information is depicted. Generally, security component 165 may communicate with various Global ID's 1220a–1220n owned by various individuals, businesses, machines and the like. Each Global ID 1220a–1220n is used for authentication of the entity accessing a part of system 100. The Global ID's 1220a–1220n are not intended to include profile properties of the entities that they represent. Rather, in one embodiment, profiles are stored using the "MyState" adapted directory 905, discussed above and provided by the directory component 150. The "MyState" adapted directory 905 may optionally include various portions represented by reference number 905a–905n. The MyState adapted directory 905 provides a place to store user profiles containing user data according to an agreed-upon schema. Generally, each Global ID 1220a–1220n provides an index to profile information stored in the individual portions of MyState service, in an application, or in site-specific data stores. An entity, therefore, may have multiple Global IDs 1220a–1220n each one having a different profile associated therewith.

Alternatively, in one embodiment of security component 165, each Global ID 1220a–1220n may be associated with another architecturally distinct service called herein the "Group Membership" service 1224, that may optionally include various sub-portions, only one portion of Group Membership service 1224 being illustrated and designated by reference numeral 1224c. The sub-portion 1224c allows one Global ID; say Global ID 1220b, to have one or more profiles within a profile list for each category 1226a–1226n of users. Alternatively, each category 1226a–1226n may include one or more pointers to the requested or defined profiles. For example, in a business-to-business scenario, the Group Membership service 1224 might be used to contain a list of authorized purchasers that many suppliers could examine. In a collaboration scenario, the Group Membership service could contain the project members of another corporation who are allowed to access project confidential documents. In still yet another illustrative example, each Global ID 1220*a*–1220*n* may include one or more digital signatures, X.509 certificates, eXtensible Markup Language (XML) certificates or "licenses" or other certificate formats that bind a key to an identity and prevent repudiation of identity. In such a case, various certificate authorities (CAs) may issue such certificates, such as but not limited to Microsoft® Passport, Microsoft® Hotmail and/or various other third party businesses.

Referring again to FIG. 10, according to another aspect of the present invention, security component 165 includes an authorization module 1104. Authorization module 1104 includes various hardware and/or software modules and components to determine what actions an authenticated entity may perform in a dynamic environment in which group membership, roles and delegation of rights of each entity may be changed. As such, authorization module 1104 of security component 165 may control enforcement of an entities usage restrictions on regulated materials, such as but not limited to private data and "licensed content" such as copyrighted books, songs and movies in ways that are more complicated than the traditional "user-based" permission models. Additionally, broader and more flexible delegation and control mechanisms of authorization module 1104 expand the traditional role of authorization.

One manner by which authorization module 1104, optionally in combination with other modules of security component 165, accomplishes advancement in the authorization field and technology is through digital rights management. Digital Rights Management (DRM) involves the automated enforcement of rules and conditions on the use and distribution of information and content. At the heart of DRM is a premise that runs against traditional system security intuition. In typical system security, the source of authority to access data or information is a user. Once a user is authenticated, access to services is authorized based on user identity. As such, software is authorized to the extent rights are granted to the underlying user. Typically, an authenticated super-user (or administrator) is granted essentially infinite access to any and all resources. DRM changes these assumptions in a few ways. In DRM, the source of authority is the owner of the content or information. The rights of the owner (and the permissions granted to the user) are named in a standard language. The rights are enforced by a "device," such as but not limited to various hardware and/or software modules and components, that insures that only trusted software, software that has previously been authenticated and obligated to enforce the rights and limitations specified by the owner, is granted access to the information. This allows a content owner to delegate rights, not to a user, but to a piece of software that will restrict access to content based on the terms defined by the owner.

One illustrative "device" by which DRM may be achieved is a trusted device called the Authenticated Boot/Isolated Execution enabled personal computer. The "device" may include a trusted (and tamper-resistant) hardware component that retains one or more private keys unique to the hardware component. In operation of the Authenticated Boot/Isolated Execution enabled personal computer, a client piece of software requests that the trusted device authenticate its identity (for example by hashing its code and comparing the hash to a certificate naming the hash signed by an authority "trusted" by the hardware). As collateral effect of authentication, the physical addresses used by the requesting software are isolated and other programs (including the OS) are thereafter denied access to that physical memory. Finally, the operation of a private key, unique to the hardware, is made available to the (now trusted) software. One skilled in the art may appreciate that various other devices, whether hardware, software, or combination thereof may performed the desired function of a device used for DRM.

According to another aspect of the present invention, security component 165 includes a privacy module 1106. The privacy module 1106 includes various hardware and/or software modules and components that retain the confidentiality and privacy of information transmitted and retrieved by various entities utilizing the beneficial characteristics of system 100 and application 200. Generally, privacy module 1106 of security component insures that personal or high-value information traversing public networks and stored on shared public servers within server federation 120 is only disclosed to authorized entities. Additionally, privacy module 1106 maintains data integrity of all types of data and information traversing and/or stored on public servers, thereby preventing unauthorized modification of transmitted data that is in transit between one or more entities. Although privacy module 1106 is shown as an independent module of security component 165, it may be appreciated by one skilled in the art that the functionality of privacy module 1106 may be incorporated within authentication module 1102, authorization module 1104, one or more of the various other modules forming security service 1100, or merely a function of security component 165 without having a specific independent modular form.

In light of the above and the other teachings contained herein, the functionality of privacy module 1106 may be achieved in a variety of manners. For example, in one embodiment, digital integrity may be maintained through use of digital signatures and the ability of privacy module 1106 and/or security component 165 to manage repudiation of identities. In another illustrative embodiment, an encrypted transport is used to transmit the data and information between multiple hosts or multiple points of client devices 110 and server federation 120. Whether the encrypted transport is host-to-host or point-to-point depends upon whether the communication is online and offline (store-and-forward) communication. One aspect of the encrypted transport process of one embodiment of the present invention is that the data and information transmitted is optionally partially or totally encrypted. By encrypting selectively within the data and information, such as messages (end-end) for application-specific transactions, security component 165 provides secure private information without the cost of encrypting all network traffic.

For host-to-host transport a security protocol termed Internet Protocol Security (IPSEC)) is needed to implement virtual private network (VPN) tunnels and to authenticate network connections of participating systems. The intermediate servers (such as but not limited to caches, airstreams, content based routers, etc) used for host-to-host transport are designed to use selective message encryption because lower-level network services typically do not enforce a confidentiality policy unique to each application. Use of selective message encryption is optional since only application content that gains a performance benefit of caches or requires intermediate servers to filter content received a benefit therefrom. In contrast, personal or high-value information is encrypted for confidentiality and does not generally gain from the services of intermediate network devices, such as intermediate hardware and/or software modules and components.

In point-to-point communication, a secure sockets layer (SSL) protocol is used and continues as a least-common-denominator legacy to those applications that are not designed to use selective message-based encryption. One skilled in the art may appreciate that IPSEC may optionally be used as a point-to-point transport. Generally, confidentiality and privacy of transported data and information may be achieved using a combination of known methods.

In yet another embodiment of the present invention, security component 165 optionally maintains all data transmitted via the Internet in an encrypted form. Currently, the majority of information transmitted on Internet today is not encrypted. With adequate hardware and system support, security component 165 of the present invention may optionally shift transportation of information and data from the current "encryption on (limited) demand" to an "always encrypt" solution. Although encryption is a useful manner by which information and data is protected, is not, by itself, a complete solution to all security needs. As such, security component 165 of the present invention may combine the characteristics of total encryption of transportable data within the beneficial properties and characteristics of authentication and/or authorization hardware and/or software modules, components, and functionality.

According to another aspect of the present invention, security component 165 is distributed throughout the server federation 120 and thereby provides distributed network security. Generally, the distributed nature of security component 165 provides end-to-end confidentiality and integrity of message content, whether host-to-host or point-to-point, while permitting intermediate proxy servers to route events and messages correctly. Overall network security control data flow to prevent malicious interference with computing nodes (flooding, destructive viruses, for example) and unauthorized dissemination of sensitive material. Typically, many of these functions are performed by firewalls. Unfortunately, with the advent of XML messaging over Hypertext Transfer Protocol (HTTP), traditional firewalls are less effective at discriminating between entity requests. Selective use of encryption within message streams, as described above, may allow message content filtering without loss of confidential, personal data; however, this also limits the kind of protection that can be afforded by firewalls.

Currently, firewalls operate mostly at the transport layer, checking transport level information such as source and destination Internet Protocol (IP) address and Transmission Control Protocol/User Datagram Protocol (TCP/UDP) port. Although useful, many traditional firewalls are already extended to scan accessed data for viruses in binaries or to scan text for illegal content. The classic firewall model, therefore, is being questioned by two independent trends: the use of encryption prevents data inspection, or even the inspection of ports; and the use of HTTP by XML-based applications that share a single TCP port reduces the value of TCP level filters. As such, current firewalls are limited in their effectiveness since they mix two functions: protection against external attacks and the enforcement of policies. As such, the present invention includes a firewall module 1108 that increases the effectiveness of firewalls by sharing the functions thereof between three or more different modules and components that may be localized within a single hardware and/or software module or alternatively distributed throughout server federation 120.

Referring now to FIG. 12 that depicts illustrative elements of firewall module 1108. One portion of the improved firewall module 1108 is a personal firewall 1310. The personal firewall 1310 performs data inspection locally, after decryption, and performs various other protection functions. For example, personal firewall 1310 performs the various function of "virus check" systems; however, when a new attack is detected, the attack signature is quickly propagated to all personal firewalls, thereby blocking the attack without having to wait for the next system or application upgrade. If a personal firewall is installed on every internal host, the host may detect a Trojan activity from other hosts or on the network, such as system 100. This thereby reduces the possibility of a Trojan attack that may be instigated directly against local hosts without being monitored by a perimeter firewall.

A second portion of the improved firewall module 1108 is a security gateway 1312 that enforces entity policy of the entity owning the particular hardware and/or software modules and components forming part of server federation 120. Each security gateway 1312 performs checks based on source and destination Uniform Resource Locator (URL), as well as HTTP method: GET, POST, NOTIFY. The security gateways 1312 are explicitly inserted in application 200, as HTTP proxies, and may decide, for example, which external pages may be readily accessed at what time of day, or which users may receive external notifications. Security gateways 1312 are hosts and hence can be IPSEC or SSL endpoints. Additionally, each security gateway 1312 may have access to the XML structured data, and therefore to the content of the messages transmitted from the particular host.

One optional function of security gateways 1312 is to "punch holes" in a perimeter or transport level firewall 1314 (discussed hereinafter), such as to authorize an end-to-end media stream. The streams may be set up by an HTTP or SIP exchange that is monitored by security gateway 1312, but will be transmitted using User Datagram Protocol/Real-Time Transport Protocol (UDP/RTP), not HTTP. The security gateway 1312 decides the pairs of IP addresses and TCP/UDP ports that are authorized. Each security gateway 1312 also has the ability to authorize use of IPSEC between two pairs of IP addresses.

The third portion of the improved firewall is the perimeter (transport layer) firewall 1314 that grants or denies access to the local network of system 100, possibly under the control of security gateways 1312. Transport layer firewalls 1314 have the responsibility of controlling which "outside" traffic gets to the machines on the inside, and limiting such access only to those "outside" sources that are well managed. In a default configuration, these authorized machines include security gateway 1312.

Generally, the split of the perimeter control function between "transport level firewalls" and "security gateways" allows for performance and scalability of system 100 and/or application 200. The transport level firewall 1314, similar in nature to a router, may be connected in parallel to achieve scaling, while the security gateway 1312, that is an application server, may utilize the scaling technologies used for scaling web servers.

Although FIG. 12 illustrates each portion 1310, 1312, and 1314 of firewall module 1308 to be integrated therein, it is understood that each portion 1310, 1312, and 1314 may be distributed throughout server federation 120. Furthermore, the security service component 165 may include multiple firewall modules 1108 and multiple portions 1310, 1312, and 1314.

According to another aspect of the present invention, security component 165 may include various hardware and/or software modules and components that allow use of digital signature, time-stamping, and notary services. Use of digital signatures provides users with many of the benefits of physical signatures in electronic transactions, such as but not limited to proof of origin, proof of authorization, legal recourse in case of subsequent disputes, etc. Furthermore, the ability to integrity seal a document (any modifications invalidate the signature) is also valuable in the electronic world where information often traverses unreliable communication and processing channels.

Security component 165 of the present invention may be configured to support technologies currently used for digital signatures such as, but not limited to digital signature algorithm (DSA), and Elliptic Curve, and the encryption technologies developed by RSA Data Security, Inc., (RSA). Additionally, security component 165 is flexible in that they may be manipulated to generate secure digital signature for use with XML and XML schemas. For example, in typical signed email systems (Secure/Multipurpose Internet Mail Extensions (S/MIME) or Pretty Good Privacy (PGP) techniques), the user implicitly trusts their email program to sign an email encoding of the email they composed. Unfortunately, for documents that involve high value and potential liability, greater protection may be required. Use of XML or general XML schema to represent such important documents allows creation of a general-purpose tool that provides a canonical representation of the XML document. Generation of a canonical representation of a document is a requirement for creating and verifying digital signatures.

Security component 165 may further include time stamping and notary services that may optionally incorporated within the hardware and/or software modules performing the digital signature functionality and services. A time-stamping service, like a digital signature, provides strong evidence that a document (in the most general sense) existed at some point in time. Similarly, a digital notary service provides evidence that someone digitally signed a given document at a point in time. Examples of these types of services that may be incorporated within security service 300 include, but are not limited to Surety, Entropic, e-TimeStamp, with both X.509-based and PGP-based trust models being used. Additionally, draft standard time-stamping protocols covering interfaces to such a service are proposed. Security services of the present invention allow interoperability of existing services, while providing hardware and/or software flexibility to comply with currently evolving related services.

Generally, security component 165 may incorporated within the platform core operating system (OS) of a device, thereby affecting all other modules and functions of the OS, services, applications, and tools of the platform. Alternatively, security component 165; modules 1102, 1104, 1106, and 1108, and the functionality provided therein may be disposed at various locations within server federation 120, client devices 110 and/or application 200 or may be distributed throughout. In still another configuration, security component 165 may be positioned between emissary component 220 and fiefdom component 230 of application 200. Additionally, as illustrated in FIG. 10, each module of security component 165 may or may not communicate with one or more of the other modules 1102, 1104, 1106, and 1108 contained therein, as shown by dotted lines.

The security component 165 may be utilized in a variety of communication scenarios that assist in allowing consumers, businesses, governments, and the like greater Internet connectivity and collaboration, with increased inter-Web site communication. For example, a first scenario is in a consumer-to-service or business environment. The security component 165 of the present invention allows greater communication, notification, streaming media, gaming, and collaboration services, whether for home computer security with "always on" digital subscriber lines (DSL) and/or Cable Modem systems and other home networking scenarios. Security component 165 protects the consumer in the consumer-to-service environment from (i) abuse of Internet signaling messages such as instant messages or Internet telephony, for the equivalent of random ringing on the front door; (ii) activity tracking of user's activities, thereby reducing "precision targeting" of users by advertisers and others; (iii) abuse of personal resources through the Trojan process of using a person's computer as part of an attack mounted towards third parties; (iv) denial of Internet service; and (v) criminal activities, such as illegal access of an individual computer resulting in money transfers, unwanted purchases that literally steal from the consumer, and the like.

Another scenario is the small business oriented service platform for application service provider (ASP) hosting. The security component 165 of the present invention provides increased protection for messaging, file and print services, hosting of enterprise resource planning (ERP) applications, on-line business activities, such as integrated electronic document management and online business services, employee personal web storage, and the like. Additionally, security component 165 allows various businesses to have a hosted web presence, delegated, role-based administration, and vanity domains. As such, the present invention, and more specifically security component 165, allows small business to have the capability of having secure access to multiple ASPs in order to get all of their business application needs addressed.

Yet another scenario is the consumer-to-business-to-business environment. This scenario includes many of the requirements previously described above with respect to the consumer-to-services scenario, while including the problems and requirements of a business-to-business relationship. As such, security component 165 provides security for multiple entities in a heterogeneous environment. Security component 165 provides on-wire, persistent information protection, while supplying non-repudiation of customer information functionality. Furthermore, security component 165 may authenticate and authorize middle tier transactions, client-server activities, and negotiate peer-to-peer trust.

A final illustrative scenario is the business-to-business environment. Security component 165 may be configured to support supply chain applications, business-to-business collaboration, etc. Furthermore, management of cross-enterprise trust relationships independent of specific authentication mechanisms is supplied. Additionally, security component 165 reduces the possibility of: (i) unauthorized transactions lead to financial losses; (ii) a fraudulent claim by a business partner that a request for a transaction was not authentic, because credentials were accidentally disclosed; (iii) unauthorized access to servers 140 or clients 110 by unauthorized personnel; (iv) information leaks to competitors that observe data access requests and responses and obtain confidential data; (v) an attacker pretends to be a business partner in a data retrieval requests and returns incorrect data; causing incorrect decisions to be made; (vi) untrustworthy system operators at the site where the data is stored to leak valuable data to confederates by sending it over the net; (vii) an insider using the Internet to send inappropriate information to outsiders; and (viii) creation of misunderstood or misapplied policies that result in leaked information, unauthorized transactions, or interference with authorized transactions.

K. Code Management

The code management component 175 ensures that users transparently have access to the most updated applications and code that they need. FIG. 13 illustrates the use of manifests in various aspects of code management. Code management primarily concerns formalizing the abstractions and interactions between interoperating components, services, and applications. This formalization provides a layer of isolation at each level for managing the software that is composed of these underlying building blocks. A manifest is essentially a database that describes a component, service, or application in some detail. By describing the code components, the relationship between the code components, and the applications that are composed from them, manifests allow for a system to understand what an application is and thus effectively manage that application. An application or service is defined by a root manifest that is similar to a code component manifest, except that the root manifest includes a starting point for executing the application or service.

Manifest 1400 includes various categories of information for describing the software associated with the manifest. It should be understood that the identified categories are exemplary only and do not necessarily limit the present invention in any way. Likewise, the descriptions of information within each category are also exemplary. Any description of information in the context of a particular category should not be interpreted as a requirement for that information to appear only in that category or to appear at all. Note that where the term "software" is used in conjunction with FIG. 13, the term should be interpreted broadly to include components, servers, applications, and the like.

Manifest 1400 is a superset of information for making its associated software usable in one or more computing environments. For example, manifest 1400 identifies the executable code 1410 and resources 1420 that are part of the software. Depending on the operational needs and requirements of the associated software, executable code 1410 and resources 1420 may reference either private (local) or external dependencies. Because a manifest 1400 is associated with all software and all manifests describe any external dependencies, software objects can be garbage collected without managing reference counts for shared DLLs as is the practice in the prior art.

Dependent manifests 1430 identify the external dependencies of manifest 1400. That is references to software and manifests that are not local so manifest 1400. For example, manifests may cascade, where one software object is simply an extension of some other software object. This allows for straightforward construction of simple customized applications. The customized applications may override some settings or resources used by the base application to change the appearance of the applications and their behavior. The base application may provide restrictions on what parts of itself are open to this kind of modification to properly limit the scope of customization to intended areas. These references to other software and manifests that are external to manifest 1400 are stored in dependent manifests 1430. Dependent manifests 1430 also may identify manifests that are local to manifest 1400, but individually defined. Alternatively, dependent manifests 1430 may include separately stored manifests that are logically included or linked with manifest 1400. Such an arrangement may be beneficial where information is relevant only for only a limited purpose, such as development of the software, and is not needed during normal operation.

Entry points 1440 expose public names for software objects (such as entry points, resources, and services) that manifest 1400 and its associated software make available to external software. Software object names local to manifest 1400 may also be present in entry points 1440. Names and metadata are used to identify a particular software object and all other software objects used by that software object. (Metadata includes information such as version, locale, and platform.) Binding is the process by which a name dependency is resolved. Once a name has been resolved to its resulting object, that object can be used in an application. All binding between software objects goes through the manifest and can be influenced by policy applied to the manifest by the computing environment itself, an administrator, or an independent software developer. Thus, name resolution provides the opportunity to insert policy and security decisions. Because names do not actually provide code or data but are an indirection that is resolved to access code and data, it is possible to redirect or restrict access as necessary during the binding process.

For example, the manifest 1400 of an application may request to use a particular runtime software object with metadata requesting version 1. However, the administrator may have set policy such that newer versions of the particular runtime software object will be used for all requests. Note that because of the metadata information, if the application breaks using the newer version the administrator can change the policy to let the application use the version of the runtime that was known to work with the application. Name resolution also provides an opportunity to insert security into the process by not allowing resolution of certain names depending on a security policy in the system.

Configuration information 1450 identifies data tables and platform services that are needed by the software. Configuration information 1450 may also describe how the software associated with manifest 1400 can be used or should behave. For example, the software may provide a credit card clearing service. There are two options for managing the credit card transactions: (1) the service provider maintains control over the processing, or (2) the service provider allows the developer incorporating the service to manage the developer's own credit card transactions. If the service provider only implements one of these options, that information may be captured in the configuration information 1450 used to run the service. Monitors may also be included within configuration information 1450 to provide developers with performance and debugging information.

As noted above, manifest 1400 facilitates maintaining various versions of software. This feature may be highly useful when deploying new software. The nature of manifests 1400 allows for the diverse state and configuration information of various components, services, and applications to be isolated from each other. This isolation means that different versions of components, services and applications may run side by side, permitting other software objects access to the specific version of the software for which they were designed and tested. As a result, multi-tier deployments (from front end servers to back servers), isolated and shared deployments, and phased deployments with old versions finishing work while new versions startup are possible.

Manifests, such as manifest 1400, provide significant benefits to code management. For example, manifests (1) allow for self-description of components, services, and applications; (2) enable application composition from components, services, or other applications by developers and administrators; (3) facilitate component/service/application naming, discovery, and binding at runtime; (4) enable development/design time scenarios with the added issues of licensing, versioning, distribution, and documenting; (5) enable interoperability of legacy systems; (6) easy distribution/installation of components, services, and applications; (7) enable ongoing management of application/service/component health.

The above-described code management uses the manifest to allow developers, administrators, and end users to write, consume, deploy, update, name, and locate application across the client and server tiers illustrated in FIGS. 1 and 2. The following example describes, with reference to FIGS. 1 and 2, how the manifest may be used to install and run an application from a client.

In this example, the user, via a search engine or other shell, uses one of the clients 110 of FIG. 1 to navigate to a Uniform Resource Locator (URL) for a particular word processing application, the URL being located within the server federation 120. If this application is already "installed" (i.e., has been previously run) on the client, the application runs from the local cache when the URL is navigated to. If the application is not "installed" on the client (i.e., has not been previous run on the client), the application will be downloaded and run using a process that is now described.

An installer module downloads the manifest associated with the application. The installer then compares the manifest with the configuration of the client for both platform requirements and known incompatible assemblies. In the event that the application cannot run on the client, error messages appear on the client. If the application can run on the client, the installer connects to the site in the server federation 120 using the URL. The client then displays some user interface such as purchase/leasing/authentication decisions as well as the End User Licensing Agreement (EULA). The application is then downloaded on demand or as a package of typical functionality. Automatic servicing of the application will be driven via regular updates of the manifest from the install URL using asynchronous messaging in accordance with the present invention.

L. Scenarios

The following scenarios illustrate how the distributed computing services platform 115 of the present invention empowers users by enabling easier collaboration and communication. The scenarios are divided into three categories of users: (1) knowledge workers; (2) consumers; and (3) developers.

Knowledge Worker/Business Scenario

A small business bike manufacturer, called 7Cycles. is owned by Alex. 7Cycles has just designed a new high-end bike and needs to market the new bike to sporting goods distributors. This scenario illustrates several business themes (e.g., integration and access to information anytime/anyplace) and technology themes (e.g., schema based integration, next generation productivity tools, federation across devices).

Alex's personal computer (PC) displays her personalized user interface, including her "start page" or "home page" which shows messages, calendar, contacts/"buddy list", and so forth. The user interface is multi-modal in that it includes voice messages and e-mail messages in a single unified interface. The voice messages may be converted into text messages and the e-mail messages may be converted into voice messages as desired. Also, the user interface is not application-based, but is content-based. For example, the start page includes information (i.e., voice mail messages, calendar, contacts, and so forth) that is conventionally provided by a variety of applications.

Alex uses her PC to log onto a service designed to help manage businesses (for example, bCentral™, provided by Microsoft Corporation) and uses the service to add the new bike to 7Cycles' on-line catalog. The service brings up a template for a catalog entry. She then searches 7Cycles' corporate intranet (including both her personal data store and other sources) for information on the new bike (pictures, marketing quotes, product specs, etc.) and drags-n-drops the appropriate information to the catalog template. The product specs for the bike are provided in a common description language (i.e., XML) and conform to a schema (see SCHEMA section above) such that catalog template service understands the information in the spec and populates the template with the appropriate information. Alex previews and publishes the updated catalog page. The new bike is then listed on 7Cycles' website.

Alex then uses the service to query a directory for a listing of other sites/companies that could feature the new bike. Since the directory services (see DIRECTORY section above) offers Internet-wide directory services through schema-facilitated synchronization of enterprise level meta-directories, these kinds of robust, Internet-wide directory listings are greatly facilitated. Alex then shares the information about the new bike to these other companies.

Alex also uses the service to automatically generate a list of keywords about the new bike and share these to several search engines, so that people can immediately find the information about the new bike.

Alex gets an email from Sandra, an employee at a sporting goods distributor who saw 7Cycles' new bike on the Web. Sandra suggests that Alex meet her at the tradeshow. Alex receives the message on a portable client device, such as a cell phone. Although the user interface of this client device is smaller than that of the PC, the features offered by the user interface are consistent with those offered by the user interface of the PC. For example, the phone displays a scaled down version of Alex's start page having customized highlights page, showing, for example, contacts and urgent messages.

Alex navigates to a contact management page, which enables Alex to link to Sandra's schedule and provides a map to her booth at the tradeshow. Sandra's schedule may be accessible through an adapted directory that is linked to Alex's MyState directory (see DIRECTORY section) to enabling such schedule publishing. Alex uses a speech-to-text conversion to reply to Sandra's message, allowing Alex to dictate an e-mail message. She checks Sandra's calendar and suggests they meet around 2:00.

Alex arrives at the trade show and uses a proximity/location awareness service to bring up a map on her cell phone showing her personal location and the location of Sandra's booth. The map tracks her location as she approaches the booth.

When she meets Sandra, Sandra asks if she can see the specs on the new bike. Alex says all the information is located on 7Cycle's corporate intranet. She borrows Sandra's Tablet PC and logs in as a guest user—her start page (just like the one on her work PC) is displayed, with geo-relevant information at the bottom (e.g., local things of interest to Alex). Thus, the storage, directory and security components described above allow Alex to authenticate herself on a new client device and have all of her personalized information available to her through the client device. Alex finds the bike specs and requests that the information be shared to Sandra, from her recent contact list. After Sandra logs in, the bike spec is available on her TabletPC, in a secure manner through federated security domains.

After Sandra returns from the tradeshow, Sandra uses her work PC to access both voice and e-mail messages. Sandra's start page displays a mix of personal, professional, and web information. Sandra sends a message to her co-worker that they need to prepare a proposal to a sporting goods chain retailer about the new bike. As she types, the system recognizes certain content as appropriate for action menus, e.g., another co-worker's name and the date the proposal is due. The system recognizes the relevance of the data types enabling them to be automatically and appropriately linked to contact & calendar information. This meaningful communication is described in the SCHEMA section.

Sandra then creates a "Project Page" for the proposal, which automatically includes all the names of the e-mail using the auto-complete feature described in the SCHEMA section and sets up a web page for sharing information/collaboration and suggests documents to be included in the project. Alex (from a different company/security domain) is also included on the Project. Sandra then begins to write the proposal, which is shared in real-time with other team members. This may be accomplished using the asynchronous messaging described in the MESSAGING section. They use Instant Messaging/Chat to discuss changes as they are being made. The proposal is a multimedia document which includes text, graphics, video, etc. Third party content (e.g., photos from an image house) can be directly integrated into the shell. Video content can be annotated.

Driving home from work, Sandra is talking to her husband from her car phone when her AutoPC notifies her that she has a message relating to the Proposal (which she has specified she should be interrupted for). These notifications issue in response to predefined events as described in the EVENTS section. Part of these predefined events include user-defined rules. For example, Sandra specified the conditions under which she was to be interrupted on her car phone. The emal is a message from the retailer that they want additional demographic information included in the proprosal. Upon arriving home, Sandra uses her home PC (which has a personal "skin" on the Start Page and where her profile may be slightly different). The preference information to form the personal "skin" may be stored in the Home Presence or MyState adapted directories discussed in the DIRECTORY section. She incorporates the additional demographic information into the proposal by filtering/merging/mapping information from external websites and her company's database into the document. This merging of information from different Websites is facilitated by schema.

The next day, Alex receives a message from Sandra that they need to change their order to ship bikes overnight to 30 different retail stores, rather than to Sandra's business as originally processed. Alex logs onto the business service, where Sandra has filled in the template for a changed purchase order, which has also been flagged for Alex by a notification form. Alex reviews and hits "Accept Changes" on toolbar, resulting in the system using schema to realize that it should query Alex whether she wants to confirm shipping via UPS. She says yes and the system creates a new shipping event, connecting Alex with UPS to arrange shipping. Calendar negotiation between UPS and 7Cycle sets the time for pick-up, which is automatically indicated on Alex's calendar. Sandra receives notification that the change order has been processed. The business service is able to track events (order received, order shipped, and so forth) for users by employing a distributed event system. The business service sends notification to Sandra via a notification manager. The notification manager, part of an overall notification system providing her with context-sensitive notification services, serves to monitor a variety of incoming notifications. The notification manager forwards important and context-sensitive messages to Sandra, depending on its inference about Sandra's current context, attention, location, and availability of devices.

Consumer Scenario

This scenario focuses on the advantages of the present invention for a general user or consumer. The scenario describes a family going on a vacation and a day in the life of the teenage daughter.

This scenario illustrates the improved messaging, the simplification of daily tasks, and the improved entertainment provided by the present invention. Some of the key features include a common persona for a given person that exists everywhere, a consistent set of interactions across device spaces, consistent data capture, access to all resources of the digital era (privacy, natural two-way communications across device spaces, consistent user experience, personalized entertainment, web a natural part of people's lives).

The family father ("Dad") uses a home PC to plan a family vacation to Los Angeles and the San Diego zoo. Using one service, Dad gives the PC a few key pieces of data and the system suggests and books flights, hotel, car and gets zoo tickets by entering info only once. Since the servers enjoy the ability to meaningfully exchange information under the schema based messaging, the servers were able to communicate as a server federation in acquiring diverse data such as flight, hotel, and car reservation data and zoo ticket availability using a single user request. Thus, Dad did not have to connect to each server to acquire this information independently.

The system also indicates that they could save money by leaving a day early and checks everyone's calendar to see if they are available. Because calendar information is stored in XML format, the system can synchronizing everyone's calendars to see what times are available. The system further saves money by suggesting information relevant to discounts (e.g., Prime Card, AAA membership). Based on saved personal preferences, the service also stops the paper, sends email to the neighbor to feed the cat, and so forth while the family is on vacation. This illustrates the systems ability to automate daily tasks based on profiles and rules. The eventing described in the EVENTS section may be used to detect the event and perform a task based on that event.

Mom and Dad then get a reminder on the PC that its Grandparents anniversary. They use videoconferencing to make reservations and order a special cake at a restaurant. This demonstrates the multi-modal nature of the user interface. Grandparents receive an invite and accept (via their WebTV unit or PC).

The children, riding the bus to school, get a notification of the planned trip. This notification may occur via the asynchronous messaging described in the MESSAGING section. A link to the zoo application/service enables kids to check out zoo map, show times, and so forth.

When the family picks up the rental car at the airport, it is equipped with downloaded music/video preferences for each family member (Dad specified and paid for this option at the time the car was booked). The preference information for each individual was access from a mega-store as described in the STORAGE section. Thus, the preference available was readily available to the rental car.

While in car, the daughter is hungry and uses a proximity/location awareness service to locate one of her favorite fast food restaurants within certain radius of car, get directions and pre-order food for the family. The proximity/location awareness application accesses an adapted directory through the directory architecture described in the DIRECTORY section. The family has option of going through shorter, pre-order line to pick up food. They pay with a smart card.

At the entrance to the zoo, the son downloads a copy of the zoo's application to his PDA. The zoo's application includes maps, events (animal feedings), data about individual displays in the zoo (e.g., chimpanzee details), shopping promotions, and the like. He receives notification that one of his buddies from school is also at the zoo and they exchange messages and make plans to meet later. In order to facilitate this notification, a location sensor associated with the PDA may provide data to the location awareness application program. This application provides the location to the Internet-wide directory architecture described in the DIRECTORY section. The buddy also has an application which forwards the buddies' location to the Internet-wide directory service. An event hosted by the location awareness program is triggered when the buddy is within a certain distance of the son, or is in a common region (e.g., the zoo) with the son. This event is communicated from the fiefdom component of the application to the page component of the application through asynchronous messaging. The event then triggers the notification to be communicated through the PDA's user interface to the son.

Mom takes digital pictures of the family at the zoo that they post to their community website. The grandparents receive notification on their television Internet browser while they are watching TV that there are new pictures. They like the pictures and download them to electronic frames throughout the house. The grandparents are running an application that has a fiefdom layer that hosts an event that monitors the Website for new pictures. The event is triggered when the new pictures are posted resulting in a messaging being transmitted to the grandparents. The message may, for example, be generated by the body of code within the fiefdom component in response to the event (see PROGRAMMING MODEL section).

Upon returning from vacation, the teenage daughter, Jenna, uses her PC in her room and retrieves messages from when she was away. Jenna has a "teenage girl" skin on her UI. A friend left her a message about going to a concert but said it was sold out. While listening to the messages, she receives notification that she has a related message. She opens that message and it notifies her that 2 tickets have been reserved for her (Fortunately, Jenna subscribes to a music service the automatically purchases tickets for her when her favorite bands are in town). The service also provides new music clips from her favorite bands. Jenna was able to automatically purchase the tickets and obtain these new music clips to due the eventing described in the EVENTS section.

Jenna videoconferences her friend about the concert tickets thus demonstrating the multi-modal features of the UI. They then collaborate on a homework assignment (making a video report about rain forest issue). They both link to the project site and do real-time editing of video/text during the videoconference. Jenna contributes video that she made while at the zoo. When they are finished, they submit their report to the school website.

Jenna use her school's website to download a video of classes that she missed and upload any homework assignments. She learns she has to report on a current environmental issue. She instructs an intelligent news agent to find recent environmental news clips from selected sources and have them available when she wakes up. The search for the environmental news clips is facilitated by the Internet-wide synchronization of adapted directories described in the DIRECTORY section.

When Jenna gets up, she receives notification that her news clips are available. This notification was generated by an event triggered when the news clips are available. She starts to scan through them, but is running late and has the audio transferred to her AutoPC so she can finish listening on her way to school. While in the car, she selects her clip and has it downloaded to her TabletPC. This demonstrates that Jenna used the mega-store described in the STORAGE section to stored the audio in the server federation and then reacquire the audio from the server federation while on a different client device. Upon arrival at school, Jenna checks the school website on her TabletPC to read the school paper and check out the lunch menu.

After school, Jenna uses her PC to remote play a video game with her friend. The game includes face mapping/scanning technology where Jenna's face appears on the video game character. During the game, Jenna receives an instant message from her teacher commended her on her report. Jenna also receives notification that one of her favorite movies is now available for download. This notification was generated in response to an event triggered when the favorite movie was available.

Developer

This scenario describes an accident-prone man (i.e., Steve) on a business trip. The key points of this scenario are the universal secure access to personal info in the mega-store or "cloud", tiered user access to information, and easy exchange of information.

Steve is at a rental phone place in the airport and is very distraught because he left his Smart Phone at home and needs access to his information. Fortunately, Steve has his smart card with him and he is able to rent a phone and download all his personal information from the mega-store in the server federation using the smart card. This illustrates using schema as a single way to access information and using the Internet Authentication described in the SECURITY section and to access information from the "mega-store" from anywhere. The smart card authenticates Steve and tells the rental phone where Steve's information is located (i.e., calendar information is stored at X, contact information is stored at Y, etc.) The phone then retrieves this information and downloads it for Steve.

On his way out of the airport, Steve collides with a bike messenger, injuring his ankle. He is in a strange city and doesn't know where to go for medical attention. Steve calls his home doctor and asks for a nearby clinic that accepts his insurance. Reception uses a clinic referral service for more efficient aggregation of information, to locate clinics near Steve and percent coverage under his and his wife's existing health plans. She also uses calendaring sharing to find Steve an immediate appointment and interacts directly with that clinic. This illustrates the automatic mapping of business and personal schemas. Also, the listing or clinics and the clinic calendar may be made available through the directory architecture described in the DIRECTORY section Reception asks Steve to approve sharing his medical records with the new clinic. Steve authenticates himself and receives a list of his medical records (on his Smart Phone).

He then checks which records he wants to make available to the clinic. This illustrates "tiered access"—rules-based validation and rejection of access to information by any application, with security built in at the system level and supported by rich schema and data storage/access. The new clinic says Steve has a sprained ankle. They send notification to Steve's regular Doctor. They also send X-rays so the Doctor can confirm the diagnosis.

M. Conclusion

The distributing computing services platform, comprising programming model, schema, user interface, events, messaging, storage, directory, security, and code management component, facilitates more Internet based collaboration, and more inter-Web site communication.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a server federation that includes a plurality of servers that communicate with a plurality of client devices, a method for fulfilling a request comprising the following:
    a first server of the plurality of servers receiving a network request for a service across a transport-independent messaging infrastructure, the network request structured in accordance with a schema accessible to the plurality of servers and the plurality of client devices, the meaning of the network request being implied by the schema;
    the first server recognizing the meaning of the network request implied by the schema;
    the first server determining that it can access some of the information needed in order to respond to the network request without having to contact other servers based on the recognized meaning of the network request;
    the first server determining that further information is needed from at least a second server in order to respond to the network request based on the recognized meaning of the network request;
    the first server structuring a further network request for the further information in response to determining that the further information is needed, the further network request structured in accordance with a second schema;
    the first server dispatching the further network request to the second server using the transport-independent messaging infrastructure, and which includes a messaging component communicating with a common Application Program Interface that supports a plurality of transports, the Application Program Interface providing common semantics to messaging components at servers in the server federation and to messaging applications at clients in the plurality of clients regardless of the underlying transport associated with a network message;
    the first server receiving a network response from the second server across the transport-independent messaging infrastructure, the network response including the further information and the network response being structured in accordance with the second schema; and
    the first server using the further information to respond to the network request for the service.

2. A method in accordance with claim 1, wherein the first server structuring a further network request for further information comprises the following:
    the first server structuring the further network request in accordance with an eXtensible Markup Language (XML).

3. A method in accordance with claim 1, wherein the first server receiving a network response from the second server comprises the following:
    the first server receiving the network response from the second server in the form of a data structure structured in accordance with an eXtensible Markup Language (XML).

4. A method in accordance with claim 1, wherein the first server dispatching the further network request for the further information to the second server using a transport-independent messaging infrastructure comprises the following:
    the first server dispatching the further network request for the further information using a Simple Object Access Protocol (SOAP).

5. A method in accordance with claim 4, wherein the first server structuring a further network request for the further information comprises the following:
    the first server structuring the further network request in accordance with an eXtensible Markup Language (XML).

6. A method in accordance with claim 1, wherein the first server receiving a network response from the second server comprises the following:
    the first server receiving the network response from the second server using a Simple Object Access Protocol (SOAP).

7. A method in accordance with claim 6, wherein the first server receiving a network response from the second server further comprises the following:
    the first server receiving the network response from the second server in the form of a data structure structured in accordance with an eXtensible Markup Language (XML).

8. A method in accordance with claim 1, wherein the first server dispatching the further network request for the further information to the second server using a transport-independent messaging infrastructure comprises the following:
    the common Application Program Interface communicating with an appropriate one of the plurality of transports in response to the messaging component communicating with the common Application Program Interface.

9. A method in accordance with claim 8, wherein the common Application Program Interface communicating with an appropriate one of the plurality of transports comprises the following:
    the common Application Program Interface communicating with a HyperText Transport Protocol (HTTP) transport.

10. A method in accordance with claim 8, wherein the common Application Program Interface communicating with an appropriate one of the plurality of transports comprises the following:
    the common Application Program Interface communicating with an MSMQ binary transport.

11. A method in accordance with claim 1, wherein the common Application Program Interface communicating with an appropriate one of the plurality of transports comprises the following:
    the common Application Program Interface communicating with a multicast transport.

12. A method in accordance with claim 1, wherein the common Application Program Interface communicating with an appropriate one of the plurality of transports comprises the following:
   the common Application Program Interface communicating with an SMTP transport.

13. A method in accordance with claim 1, wherein the first server receiving a network request for service comprises the following:
   the first server receiving the network request for service from a third server in the server federation.

14. A method in accordance with claim 1, wherein the first server of the plurality of servers receiving a network request for service comprises the following:
   the first server receiving the network request for service from a client of the plurality of clients.

15. The method as recited in claim 1, wherein a first server of the plurality of servers receiving a network request structured in accordance with a schema comprises the first server receiving a network request structured in accordance with a schema stored in schema store, the schema store accessible to servers in the server federation and clients in the one or more clients, the schema store providing standardized schema services to servers and clients to facilitate meaningful communication and information exchange across the servers and clients.

16. The method as recited in claim 15, wherein the standardized schema services include storing, finding, querying, publishing, and sharing schema information.

17. The method as recited in claim 15, wherein the schema store is distributed throughout servers in the server federation.

18. The method as recited in claim 15, wherein the schema store stores core schemas defining data formats for a subset of common data items used by a plurality of different applications residing at servers in the server federation.

19. The method as recited in claim 1, wherein a messaging component communicating with a common Application Program Interface that supports a plurality of transports comprises an act of a messaging component communicating with a common Application Program Interface that provides one or more services for transports that do not inherently implement the one or more services so as to increase the compatibility of transports that do not support the one or more services with transports that do support the one or more services.

20. The method as recited in claim 1, wherein the first server determining that further information is needed from at least a second server in order to respond to the network request comprises the first server determining that is has some but not all of the information that is needed in order to respond to the network request.

21. The method as recited in claim 1, wherein the schema and the second schema are the same schema.

22. A computer program product for use in a first server of a server federation, the server federation including a plurality of servers that communicate with a plurality of client devices, the computer program product including a computer-readable medium having stored thereon the following:
   computer-executable instructions for detecting the receipt of a network request for a service across a transport-independent messaging infrastructure, the network request structured in accordance with a schema accessible to the plurality of servers and the plurality of client devices, the meaning of the network request being implied by the schema;
   computer-executable instructions for recognizing the meaning of the network request implied by the schema;
   computer-executable instructions for determining that the first server can access some of the information needed in order to respond to the network request without having to contact other servers based on the recognized meaning of the network request;
   computer-executable instructions for determining that further information is needed from at least a second server in order to respond to the network request based on the recognized meaning of the network request;
   computer-executable instructions for structuring a further network request for the further information in response to determining that the further information is needed, the further network request structured in accordance with a second schema;
   computer-executable instructions for causing the further network request to be dispatched to the second server using the transport-independent messaging infrastructure, and which includes a messaging component communicating with a common Application Program Interface that supports a plurality of transports, the Application Program Interface providing common semantics to messaging components at servers in the server federation and to messaging applications at clients in the plurality of clients regardless of the underlying transport associated with a network message;
   computer-executable instructions for detecting the receipt of a network response from the second server across the transport-independent messaging infrastructure, the network response including the further information and the network response being structured in accordance with the second schema; and
   computer-executable instructions for using the further information to respond to the network request for the service.

23. A computer program product in accordance with claim 22, wherein the computer-readable medium is a physical storage medium.

24. A computer program product in accordance with claim 22, wherein the computer-executable instructions for structuring a further network request for the further information utilizing a second schema comprise the following:
   computer-executable instructions for structuring the request in accordance with an eXtensible Markup Language (XML).

25. A computer program product in accordance with claim 22, wherein the computer-executable instructions for causing the further network request for the further information to be dispatched to the second server using a transport-independent messaging infrastructure comprise the following:
   computer-executable instructions for communicating with a common Application Program Interface that supports a plurality of transports.

26. A computer program product in accordance with claim 25, wherein the computer-executable instructions for causing the further network request for the further information to be dispatched to the second server using a transport-independent messaging infrastructure further comprise the following:
   computer-executable instructions for implementing the common Application Program Interface such that the common Application Program Interface communicates with an appropriate one of the plurality of transports in response to the execution of the computer-executable instructions for communicating with the common Application Program Interface.

* * * * *

UNITED STATES PATENT AND TRADEMARK OFFICE
CERTIFICATE OF CORRECTION

| | |
|---|---|
| PATENT NO. | : 6,990,513 B2 |
| APPLICATION NO. | : 09/887847 |
| DATED | : January 24, 2006 |
| INVENTOR(S) | : Belfiore et al. |

It is certified that error appears in the above-identified patent and that said Letters Patent is hereby corrected as shown below:

On the title page, Item (56), under "Other Publications", in column 2, line 1, delete ""Microsof" and insert -- "Microsoft --, therefor.

In column 5, line 34, delete "a" and insert -- as --, therefor.

In column 15, line 17, after "(described below)" insert -- . --.

In column 17, line 48, delete "T)" and insert -- R) --, therefor.

In column 17, line 50, delete "R)" and insert -- T) --, therefor.

In column 18, line 28, delete "in" and insert -- into --, therefor.

In column 29, line 59, before "developer" insert -- a --.

In column 34, line 6, delete "Or" and insert -- or --, therefor.

In column 41, line 52, delete "so" and insert -- to --, therefor.

In column 45, line 42, delete "emal" and insert -- e-mail --, therefor.

In column 45, line 44, delete "proprosal." and insert -- proposal. --, therefor.

In column 48, line 64, after "section" insert -- . --.

Signed and Sealed this

Thirteenth Day of April, 2010

David J. Kappos
*Director of the United States Patent and Trademark Office*